US012726129B2

(12) United States Patent
Adragna et al.

(10) Patent No.: US 12,726,129 B2
(45) **Date of Patent: *Sep. 1, 2026**

(54) METHOD FOR OPERATING IN BURST MODE ACTIVE CLAMP FLYBACK CONVERTERS AND CORRESPONDING ACTIVE CLAMP FLYBACK CONVERTER APPARATUS

(71) Applicant: STMICROELECTRONICS S.r.l., Agrate Brianza (IT)

(72) Inventors: Claudio Adragna, Monza (IT); Massimiliano Gobbi, Castel San Giovanni (IT); Giuseppe Bosisio, Sesto San Giovanni (IT)

(73) Assignee: STMICROELECTRONICS S.r.l., Agrata Brianza (IT)

( * ) Notice: Subject to any disclaimer, the term of this patent is extended or adjusted under 35 U.S.C. 154(b) by 157 days.

This patent is subject to a terminal disclaimer.

(21) Appl. No.: 18/896,371

(22) Filed: Sep. 25, 2024

(65) Prior Publication Data

US 2025/0023479 A1 Jan. 16, 2025

Related U.S. Application Data

(63) Continuation of application No. 17/951,703, filed on Sep. 23, 2022, now Pat. No. 12,136,883.

(30) Foreign Application Priority Data

Sep. 30, 2021 (IT) ........................ 102021000025133

(51) Int. Cl.

| | |
|---|---|
| ***H02M 3/335*** | (2006.01) |
| ***H02M 1/00*** | (2006.01) |
| ***H02M 1/34*** | (2007.01) |

(52) U.S. Cl.
CPC ..... *H02M 3/33569* (2013.01); *H02M 1/0035* (2021.05); *H02M 1/342* (2021.05); *H02M 3/33507* (2013.01); *Y02B 70/10* (2013.01)

(58) Field of Classification Search
CPC ............. H02M 1/0035; H02M 1/0048; H02M 1/0054; H02M 1/0058; H02M 1/34;
(Continued)

(56) References Cited

U.S. PATENT DOCUMENTS

| | | | | |
|---|---|---|---|---|
| 5,570,278 | A | 10/1996 | Cross | |
| 9,143,043 | B2 * | 9/2015 | Zhang | H02M 3/33571 |

(Continued)

FOREIGN PATENT DOCUMENTS

| | | | |
|---|---|---|---|
| CN | 107181410 | A | 9/2017 |
| CN | 110649817 | A | 1/2020 |

(Continued)

OTHER PUBLICATIONS

Liu et al., "Small Signal Analysis of Active Clamp Flyback Converters in Transition Mode and Burst Mode," 2019 IEEE Applied Power Electronics Conference and Exposition (APEC), Anaheim, California, USA, Mar. 17-21, 2019, pp. 241-248.

(Continued)

*Primary Examiner* — Thienvu V Tran
*Assistant Examiner* — Shahzeb K Ahmad
(74) *Attorney, Agent, or Firm* — Seed IP Law Group LLP

(57) ABSTRACT

An active flyback converter is transitioned between a plurality of operational states based on a comparison of a control voltage signal to voltage thresholds and a count of a number of consecutive switching cycles during which a clamp switch is kept off. The plurality of operational states includes a run state, an idle state, a first burst state, and a second burst state. Each set of consecutive switching cycles of the first burst state includes a determined number of (Continued)

switching cycles during which signals are generated to turn the power switch on and off and to maintain an off state of the clamp switch, and a switching cycle in a determined position in the set of switching cycles during which signals are sequentially generated to turn the power switch on, turn the power switch off, turn the clamp switch on and turn the clamp switch off.

22 Claims, 11 Drawing Sheets

(58) Field of Classification Search
CPC ...... H02M 1/342; H02M 1/344; H02M 1/346; H02M 1/348; H02M 3/335; H02M 3/33507; H02M 3/33515; H02M 3/33561; H02M 3/33569; H02M 3/33553; H02M 3/33592; Y02B 70/10
See application file for complete search history.

(56) References Cited

U.S. PATENT DOCUMENTS

| | | | | |
|---|---|---|---|---|
| 10,141,853 | B2 | 11/2018 | Song et al. | |
| 11,552,573 | B1 | 1/2023 | Adragna et al. | |
| 2009/0147546 | A1* | 6/2009 | Grande | H02M 3/33523 363/21.16 |
| 2018/0069480 | A1* | 3/2018 | Koo | H02M 3/33523 |
| 2020/0106368 | A1 | 4/2020 | Chen et al. | |
| 2021/0143730 | A1* | 5/2021 | Yang | H02M 3/33507 |
| 2021/0194378 | A1 | 6/2021 | Tian et al. | |
| 2023/0034912 | A1* | 2/2023 | Nicolosi | H02M 1/0035 |
| 2023/0056711 | A1* | 2/2023 | Zhang | H02M 1/346 |
| 2023/0096383 | A1 | 3/2023 | Adragna et al. | |
| 2023/0143391 | A1 | 5/2023 | Adragna | |

FOREIGN PATENT DOCUMENTS

| | | | |
|---|---|---|---|
| CN | 112271926 | A | 1/2021 |
| CN | 112510976 | A | 3/2021 |

OTHER PUBLICATIONS

Onsemi, "AC-DC Active Clamp Flyback PWM IC," Data Sheet, Publication Order No. NCP1 568, Rev. 5, Aug. 2021, www.osemi.com. (42 pages).

Texas Instruments, "UCC28780 High Frequency Active Clamp Flyback Controller," Product Folder Links: UCC28780, SLUSD12A, Oct. 2017, Revised Feb. 2018, www.ti.com. (68 pages).

Huber et al., "Flyback converter with hybrid clamp," 2018 IEEE Applied Power Electronics Conference and Exposition (APEC), San Antonio, TX, USA, 2018, pp. 2098-2103.

Yau et al., "Light-load efficiency improvement for flyback converter based on hybrid clamp circuit," 2016 IEEE International Conference on Industrial Technology (ICIT), Taipei, Taiwan, 2016, pp. 329-333.

* cited by examiner

METHOD FOR OPERATING IN BURST MODE ACTIVE CLAMP FLYBACK CONVERTERS AND CORRESPONDING ACTIVE CLAMP FLYBACK CONVERTER APPARATUS

BACKGROUND

Technical Field

Embodiments of the present disclosure relate to techniques for operating in burst mode Active Clamp Flyback Converters.

Embodiments of the present disclosure relate in particular to converters used in chargers, e.g., USB chargers, and adapters for smartphones, tablets, laptop PCs. Embodiments of the present disclosure may relate also to wall-plugs, in-wall smart outlets.

Description of the Related Art

The continuous strive for miniaturization of consumer electronics products needs to be supported by increasing the power density of internal and external power converters.

Traditionally, power density can be improved by operating at higher switching frequency, which reduces the volume occupied by passive components, such as transformers, inductors, and filter capacitors. With conventional topologies, the negative side effect of a higher switching frequency is lower efficiency due to increased switching losses. Further, in hard switching topologies, the noise and EMI becomes unmanageable at high frequency.

In low-power offline applications, the flyback topology is the most used, due its simplicity and low cost. An integral part of such topology is represented by the clamp circuit that handles the energy which gets trapped in the leakage inductance of the transformer after the power switch turns off and that therefore does not participate in the input-to-output energy transfer process.

Most commonly, the clamp is realized with an RCD structure as shown in FIG. 1A.

In FIG. 1A is shown a schematics of an embodiment 10 of an flyback converter, which comprises a transformer 11 comprising a primary winding and secondary winding, which in particular are out of phase of 180°, which receives at an input terminal, in particular a positive terminal, labelled as DC, of the primary winding a DC input voltage Vin, while at its secondary winding, between the negative terminal of the secondary winding and an output node Vout, is coupled an output diode Dout and an output capacitor Cout is coupled between the output node Vout and ground GND. With Vout is intended both the node at which the output voltage of the converter 10 is formed and the output voltage itself, the same applies for node GND and ground potential. These elements substantially embody the output portion, e.g., the output rectifier, of the flyback converter apparatus 10 while a flyback circuit is provided which includes a power switch, in particular a MOSFET, Q1, which is controlled by a controller 13, which couples selectively the negative terminal of the primary winding of the transformer 11 to ground GND. The negative terminal of the primary winding is also coupled through an RCD (Resistor Capacitor Diode) network 14, operating as clamp circuit, to the input node DC, in particular a clamp resistor Rsn and a clamp capacitor Csn are coupled in parallel between the DC input node and the negative terminal, corresponding to a clamp node CN, of a clamp diode Dsn which other terminal is coupled to the negative terminal of the primary winding.

With this clamp circuit 14 the energy stored in the leakage inductance of the transformer is dissipated in the clamp resistor Rsn and turned into heat. This represents a major loss in conventional flyback converters. The voltage drop between the clamp node CN and the input voltage Vin node is usually indicated as clamp voltage.

The Active Clamp Flyback (ACF) converter addresses all these issues by offering unconditional Zero Voltage Switching (ZVS) operation of all the power switches and rectifiers used in the circuit. ZVS is achieved by recovering in a nearly lossless manner the energy stored in the leakage inductance of the transformer.

FIG. 1B shows a basic ACF converter 20 topology, which includes the transformer 11 and the output portion downstream the secondary winding which corresponds to the one shown in FIG. 1A. At the primary winding it is still present the MOSFET switch Q1 controlled by the by the controller 13, which couples selectively the negative terminal of the primary winding of the transformer 11 to ground GND. However, instead of the RCD network 14 an active clamp circuit 24 is provided comprising a second MOSFET switch Q2, a clamp switch, which selectively couples a terminal of a clamp capacitor Cc, clamp node CN, coupled to the other terminal to the input node DC, to the negative terminal of the primary winding of the transformer 11, to the drain of the switch Q1, which is a n-channel MOSFET.

An ACF converter such as converter 20 can be driven by two different control schemes.

A first control scheme may be represented by complementary control. With this control scheme the switches Q1 and Q2 are driven in a complementary fashion, while switch Q1 is on, switch Q2 is off, while switch Q1 is off, switch Q2 is on, as shown in the timing diagram of FIG. 2A, which shows the gate signals SQ1, SQ2 for Q1 and Q2. In FIG. 2B are shown a primary current I1 flowing in the primary winding of the transformer 11, a secondary current I2 flowing in the secondary winding of the transformer 11 and a voltage Vm at the common node between switches Q1 and Q2, which, since they form substantially a half bridge, with high side switch Q2 and low side switch Q1 driven by controller 13 with the gate signals SQ1, SQ2 shown in FIG. 2A. When controlled in this way, the converter 20 may typically be operated with a fixed off-time in the Discontinuous Conduction Mode (DCM) because it is easier to control the off-time to achieve ZVS of switch Q1 at turn-on. The leakage energy is first stored in the clamp capacitor Cc and then recovered to the output side during the on-time of the high side switch Q2. There is simultaneous current circulation on both the primary and the secondary side during the on-time of the high side switch Q2 and this results in high rms currents, causing significant power loss in transformer windings and rectifier. Additionally, in applications with a variable output voltage (e.g., USB-PD fast chargers) converter operation is difficult to optimize and ZVS cannot be achieved along the entire output voltage range and efficiency may be significantly degraded in the lower end of the output voltage range.

A second control scheme may be represented by non-complementary control. With this control scheme the turn-on of the active clamp high side switch Q2 is delayed until the energy stored in the inductance of the transformer 11 is completely delivered to the load as illustrated in the timing diagram of FIGS. 3A and 3B. FIG. 3A shows the signals driving Q1 and Q2 schematically. In this case Q1 and Q2 are just never on together. In FIG. 3B are shown primary current I, secondary current Io and the voltage Vm at the common node between switches Q1 and Q2, along with the signals driving Q1 and Q2 switches, the gate of the MOSFETS. As shown, when secondary current Io reaches the minimum, the energy stored in the inductance is fully discharged, the SQ2 signal goes high, the secondary current rises and the primary current decrease in a reverse current Ir region till the SQ2 signal going low. This helps reduce the energy circulating in the transformer windings and the associated power loss. In fact, the mechanism of recovery of leakage inductance energy stored in the clamp capacitor is same as with the complementary control scheme but the time interval where there is simultaneous current circulation on both the primary and the secondary side is much shorter. Being the input-to-output energy transfer mechanism essentially identical to that of a standard flyback, the non-complementary control scheme lends itself much better to variable output voltage converters and enables ZVS across the entire operating range.

Because of ZVS and leakage energy recycling, the ACF converter generally exhibits higher efficiency than a conventional flyback at heavier loads and this often makes it the preferred choice in low-power high-density designs where the thermal issues are of primary concern.

However, the addition of the active clamp high side switch Q2 to a standard flyback converter enables soft-switching (ZVS) at the expense of additional conduction losses on the primary side (they are larger with the complementary control than with the non-complementary control). Additionally, there are the losses associated to driving the active clamp high side switch Q2 (gate driving plus switching). All these losses little depend on the load. Therefore, at very light loads these additional losses are greater than the loss saved by ZVS of Q1. On the other hand, at very light loads the energy stored in the leakage inductance of the flyback transformer is practically negligible, thus the efficiency of an ACF may be lower than that of a traditional flyback with the RCD clamp. This may be particularly true at low input voltage, where even a standard flyback converter may exhibit ZVS (when the input voltage is lower than the output voltage reflected to the primary side).

This may be quite of an issue because it may be difficult to meet the standby energy efficiency targets defined by various regulatory agencies (e.g., European Code of Conduct, Energy Star, etc.).

These considerations brought some power supply makers to consider the so-called "Hybrid Clamp," a combination of active clamp and RCD clamp, as for instance in L. Huber at al. "Flyback Converter with Hybrid Clamp," APEC 2018 proceedings, pp 2098-2103 illustrated in FIG. 4A. As it can be seen, an embodiment 30 of the AFC converter is shown which corresponds to the embodiment 20 in FIG. 1A, with a clamp circuit 34 comprising the clamp resistor Rsn coupled in parallel with the clamp capacitor Cc between the input DC and the high side switch Q2. This comes with a power management circuit that configures the clamp as an active clamp or an RCD clamp depending on the operating conditions of the converter. In the active clamp configuration, the high side switch Q2 is operated as previously said (either in a complementary or non-complementary fashion); in the RCD clamp configuration the high side switch Q2 is kept off all the time.

The load level where it is advantageous to switch from active clamp to RCD clamp and vice versa is not well predictable. It depends on a lot of parameters of the power stage, as well as the characteristics of the control. A power management circuit able to cope with this intricacy would be too complex and too expensive.

However, a very common technique for optimizing very light load efficiency in all switching converters is to make them work in the so-called "burst-mode." With this operating mode the converter works intermittently, with series (bursts) of switching cycles separated by time intervals in which the converter does not switch (idle time). Therefore, a very simple solution is to switch from active clamp to RCD clamp when the load becomes low enough that the converter starts operating in burst-mode and switch back to active clamp as the converters resumes continuous operation because the load is higher.

Compared to an active clamp, the hybrid clamp uses an additional resistor. This extra component has some impact on cost and PCB area (critical aspect in high-density designs) and especially on no-load consumption (the input power to the converter when the load is disconnected), which is one of the energy efficiency targets. Although the resistor value needed in a hybrid clamp is higher compared to that needed in a pure RCD clamp, there is a power loss that partly cancels out the power saved by not turning on Q2 and adversely affects the efficiency at an extremely light load and the no-load consumption.

The resistor Rsn, however, must be in place to prevent the clamp capacitor voltage from drifting high with no control: in every switching cycle a small amount of charge would come from the body diode of the high side switch Q2, and nothing would discharge it. Overcharging the clamp capacitor, even if not exceeding its voltage rating or not causing the voltage across Q1 during its off time to exceed its breakdown voltage, has a significant drawback. When the converter resumes its continuous switching activity, for many switching cycles large currents would flow uncontrolled during the conduction of the high side switch Q2 both in the switch Q2 and in the output rectifier, until the overcharged clamp capacitor voltage goes back to the correct value.

To save the power loss in the RCD clamp resistor, in the publication Y. T. Yaul, W. Z. Jiang, K. I. Hwu "Light-Load Efficiency Improvement for Flyback Converter Based on Hybrid Clamp Circuit," APEC 2016 proceedings, pp 329-333 is proposed to replace the resistor Rsn with a TVS (Transient Voltage Suppressor), as shown in FIG. 4B, in an embodiment 40 of the converter which comprises a clamp circuit 44 where, as shown, the clamp resistor Rsn is replaced by a TVS Tsn and a diode DT is placed in series between the TVS and the secondary winding to prevent reverse current flow through the TVS Tsn.

Such solution of FIG. 4B with respect to that of FIG. 4A provides slightly lower losses, everything else being equal. This slight improvement comes at the cost of two extra parts, one of which (the TVS) is relatively expensive, much more expensive than a single resistor.

BRIEF SUMMARY

In an embodiment, a method comprises: comparing a control signal of an active clamp flyback converter to a plurality of three or more thresholds; counting a number of consecutive switching cycles during which a clamp switch of the active flyback converter remains off; and selectively transitioning the active clamp flyback converter between a plurality of operational states by controlling a power switch and the clamp switch of the active clamp flyback converter. The plurality of operational states include: a run state of operation of one or more consecutive switching cycles of the active flyback converter, each switching cycle during the run state of operation comprising sequentially turning the power switch on, turning the power switch off, turning the clamp switch on and turning the clamp switch off; an idle state of operation of one or more consecutive switching cycles of the active flyback converter during which the power switch and the clamp switch are off; a first burst state of operation of one or more sets of consecutive switching cycles, each set of consecutive switching cycles of the first burst state including: a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off; and a second burst state of operation of one or more sets of consecutive switching cycles during which the power switch is turned on and off and the clamp switch is off. The selectively transitioning is based on the comparing of the control signal to the plurality of three or more thresholds and the count of the number of consecutive switching cycles during which the clamp switch remains off.

In an embodiment, a system comprises: an active clamp flyback converter having a transformer, a power switch and a clamp switch; and control circuitry coupled to the active clamp flyback converter, wherein the control circuitry, in operation: compares a control voltage of the active clamp flyback converter to a first voltage threshold, a second voltage threshold having a magnitude greater than a magnitude of the first voltage threshold, and a third voltage threshold having a magnitude greater than a magnitude of the second voltage threshold; counts a number of consecutive switching cycles during which the clamp switch remains off; and selectively transitions the active clamp flyback converter between a plurality of operational states. The plurality of operational states including: a run state of operation of one or more consecutive switching cycles of the active flyback converter, each switching cycle during the run state of operation comprising sequentially turning the power switch on, turning the power switch off, turning the clamp switch on and turning the clamp switch off; an idle state of operation of one or more consecutive switching cycles of the active flyback converter during which the power switch and the clamp switch are off; a first burst state of operation of one or more sets of consecutive switching cycles, each set of consecutive switching cycles of the first burst state including: a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off; and a second burst state of operation of one or more sets of consecutive switching cycles during which the power switch is turned on and off and the clamp switch is off, wherein the selectively transitioning is based on the comparing of the control signal to the voltage thresholds and the count of the number of consecutive switching cycles during which the clamp switch remains off.

In an embodiment, a device comprises: one or more comparators, which, in operation, compare a control voltage signal of an active clamp flyback converter to a first voltage threshold, a second voltage threshold and a third voltage threshold, wherein a magnitude of the second voltage threshold is greater than a magnitude of the first voltage threshold and a magnitude of the third voltage threshold is greater than a magnitude of the second voltage threshold; and logic circuitry coupled to the one or more comparators, wherein the logic circuitry, in operation: selectively transitions between a plurality of operational states, the plurality of operational states including: a run state of operation of one or more consecutive switching cycles, each switching cycle during the run state of operation comprising sequentially generating signals to turn a power switch on, turn the power switch off, turn a clamp switch on and turn the clamp switch off; an idle state of operation of one or more consecutive switching cycles of the active flyback converter during which signals are generated to maintain off states of the power switch and the clamp switch; a first burst state of operation of one or more sets of consecutive switching cycles, each set of consecutive switching cycles of the first burst state including: a determined number of switching cycles during which signals are generated to turn the power switch on and off and to maintain an off state of the clamp switch; and a switching cycle in a determined position in the set of switching cycles during which signals are sequentially generated to turn the power switch on, turn the power switch off, turn the clamp switch on and turn the clamp switch off; and a second burst state of operation of one or more sets of consecutive switching cycles during which signals are generated to turn the power switch on and off and to maintain an off state of the clamp switch; and counts a number of consecutive switching cycles during which an off state of the clamp switch is maintained. The selectively transitioning is based on the comparing of the control voltage signal to the voltage thresholds and the count of the number of consecutive switching cycles during which an off state of the clamp switch is maintained.

In an embodiment, a non-transitory computer-readable medium's contents cause control circuitry to control operation of an active flyback converter device, the controlling comprising: selectively transitioning the active clamp flyback converter between a plurality of operational states by controlling a power switch and a clamp switch of the active clamp flyback converter, the plurality of operational states including: a run state of operation of one or more consecutive switching cycles of the active flyback converter, each switching cycle during the run state of operation comprising sequentially turning the power switch on, turning the power switch off, turning the clamp switch on and turning the clamp switch off; an idle state of operation of one or more consecutive switching cycles of the active flyback converter during which the power switch and the clamp switch are off; a first burst state of operation of one or more sets of consecutive switching cycles, each set of consecutive switching cycles of the first burst state including: a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off; and a second burst state of operation of one or more sets of consecutive switching cycles during which the power switch is turned on and off and the clamp switch is off; comparing a control signal of an active clamp flyback converter to a plurality of three or more thresholds; and counting a number of consecutive switching cycles during which the clamp switch remains off, wherein the selectively transitioning is based on the comparing of the control signal to the plurality of three or more thresholds and the count of the number of consecutive switching cycles during which the clamp switch remains off.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In brief, the solution here described relates to a method to operate an ACF converter during burst-mode so that the losses associated to operating the high-side switch Q2 are reduced. Embodiments may comprise a control circuit, realized, for example, in integrated form on a silicon die, that implements said method.

Figure 5:
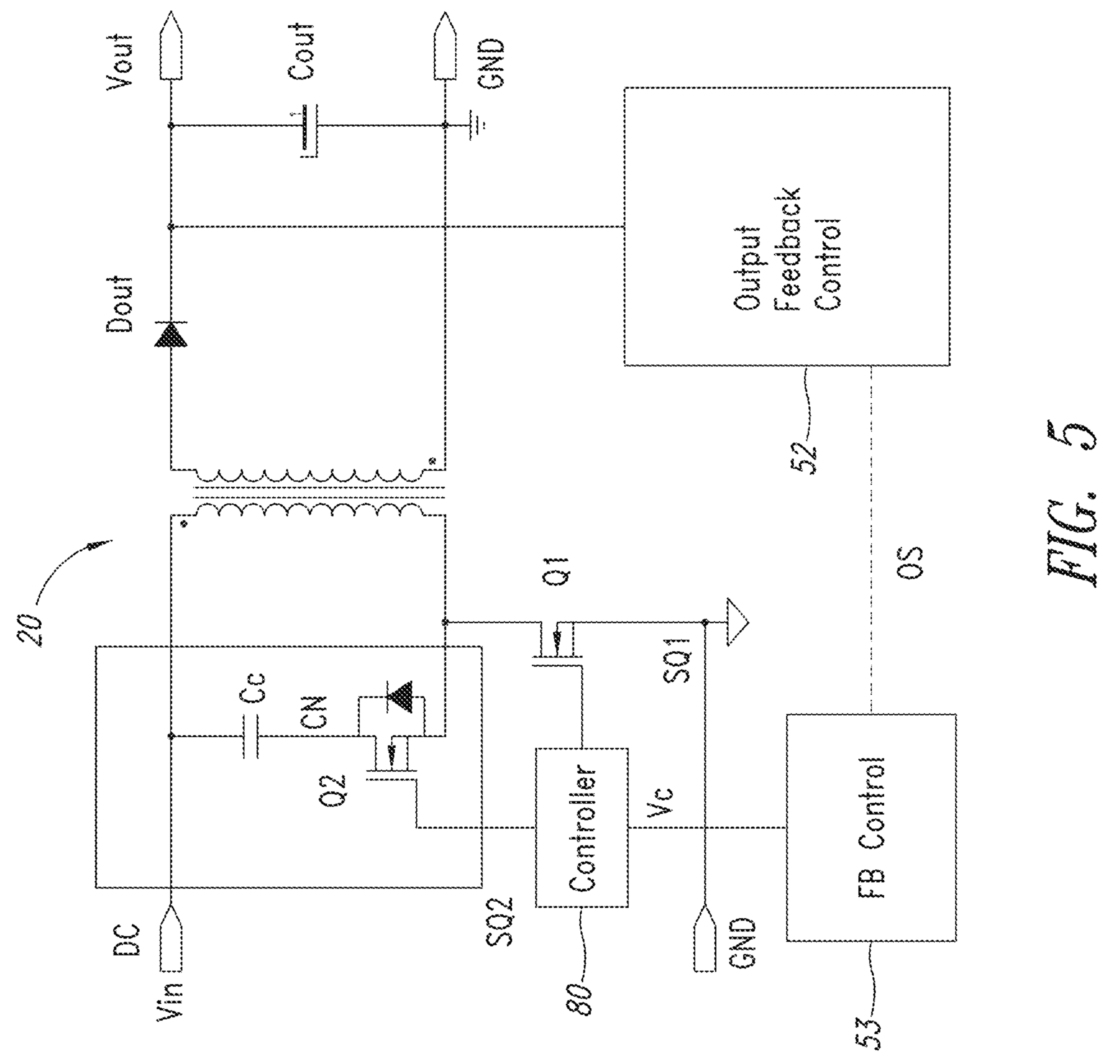
FIG. 5 shows a schematically an architecture of a converter configured to operate with an embodiment of a method here described.

In FIG. 5 it is shown an architecture of isolated ACF flyback DC-DC converter which use a converter such as converter 20 and further includes feedback control modules or circuits 52, 53 to operate the control of switches Q1, Q2 through the controller 80. First, it is here discussed how the input-to-output energy flow is controlled in such an architecture. In most DC-DC converters the output voltage is kept constant against changes in the operating conditions (the input voltage Vin in the input DC and the output current $I_{out}$) by a control system that uses closed-loop negative feedback. As shown in the block diagram of FIG. 5, this is achieved by comparing the output voltage $V_{out}$ to a reference voltage (not indicated in the Figure) in an output feedback control block 52; their difference is amplified by an error amplifier also in the output control block 52 and transferred to the primary side across the isolation boundary typically via an optocoupler OS ensuring a galvanically isolated signal transmission. On the primary side the optocoupler OS is coupled to a module or circuit 53 which receives the error signal and generates a control voltage Vc for the controller 80, which corresponds to controller 13, and supplies the gate signals SQ1, SQ2 under the control of the control voltage Vc, implementing however the method here described for burst operation.

Modules 52, 53 and 80 are configured to implement a closed-loop negative feedback using the error signal calculated in module 52 to generate a control voltage Vc. Of course, the conversion block or blocks, e.g., a PID control block, generating the control voltage from the error signal, can be either at the module 52 (thus control voltage Vc may just be transmitted over the galvanically isolated signal transmission) or at the module 53 (in this case the errors signal may be transmitted over the galvanically isolated signal transmission). Such control voltage Vc modifies a quantity within the converter 20 which the power carried by the converter 20 substantially depends on. In flyback converters (traditional or with active clamp) this quantity is typically the peak primary current in each switching cycle, which can be changed by changing the instant at which the switch Q1 is turned off, usually the instant of a falling edge of a PWM signal driving the switch Q1.

With the arrangement described, the control voltage Vc increases as the output voltage $V_{out}$ decreases (increasing the error signal) and vice versa. Since in open loop operation a load increase causes the output voltage $V_{out}$ to decrease, in closed loop operation the control voltage Vc increases when the load increases and decreases when the load decreases. Therefore, burst-mode operation can be realized by a comparator with hysteresis of a given value that compares the control voltage Vc with a threshold. Its operation can be explained as follows.

Figures 1A, 1B:
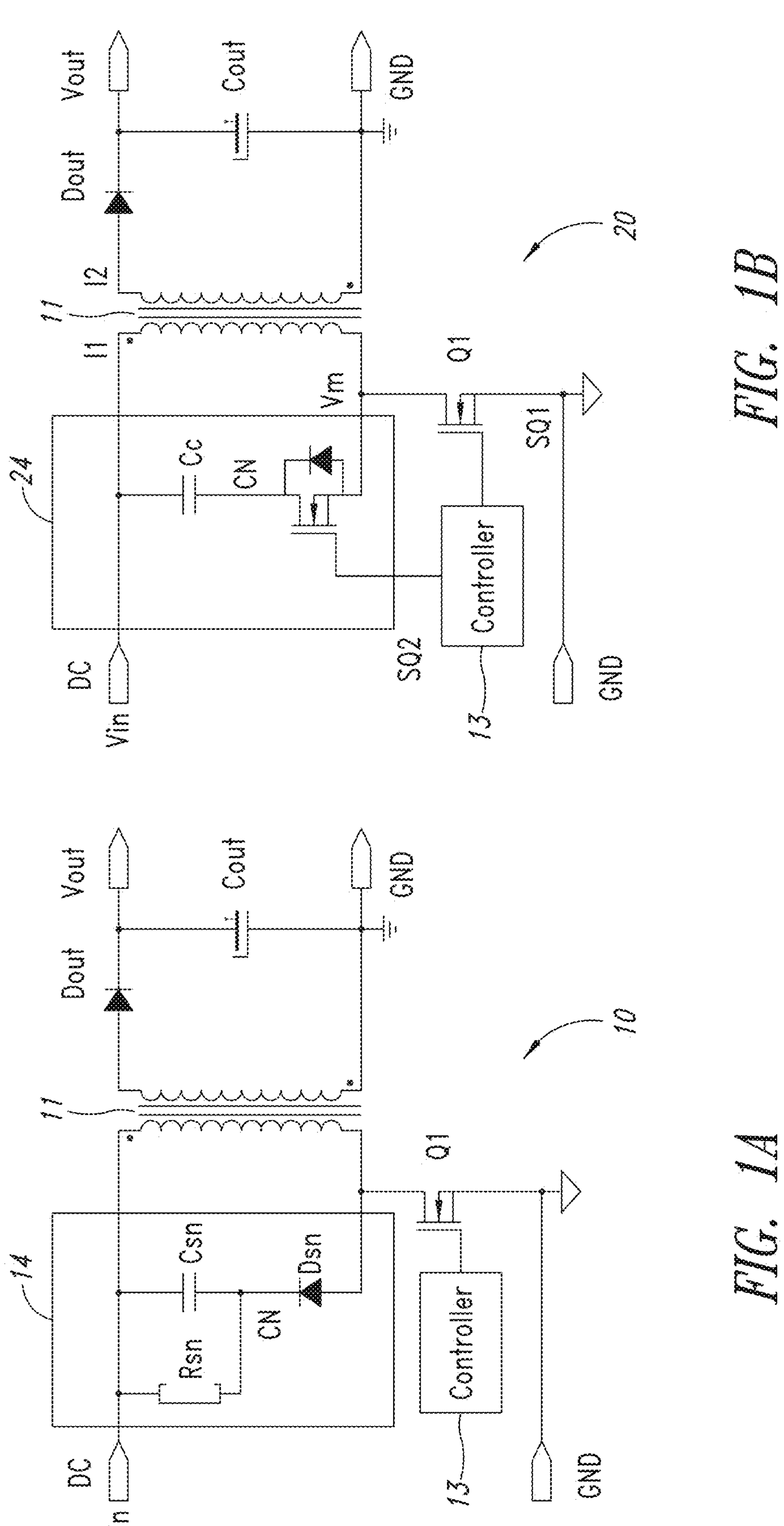
FIG. 1A is a schematic diagram an flyback converter.
FIG. 1B is a schematic diagram of an Active Clamp Flyback (ACF) converter.

When the load decreases to the point that the control voltage Vc falls below the threshold (which in the method described in the following corresponds to the first threshold Vth1), the converter stops switching and the idle time begins. Since no more energy is delivered during the idle time, the load is supplied only by the filtering system (normally, the output capacitor $C_{out}$ bank shown in FIG. 1B and in FIG. 5, which here acts as energy reservoir as well) and the output voltage $V_{out}$ starts decaying. The negative feedback loop 52, 53, 80 reacts to this decay of the output voltage $V_{out}$ increasing the control voltage Vc and as it exceeds the threshold by a quantity equal to the hysteresis value which in the method described in the following corresponds to the second threshold Vth2 switching restarts and the idle time ends. Due to this, the output voltage Vout increases; consequently, the control voltage Vc decreases and as soon as it falls again below the threshold Vth1 the converter 20 stops switching again, and so on.

Thus the converter 20 operates in burst mode between an idle mode (indicated with S2 in the following) when the converter stops switching and a normal running mode (indicated with S1 in the following) with continuous switching of switches Q1 and Q2, under the control of the negative feedback loop 52, 53, 80, which is always present in normal operation and burst operation, varying at least the signal SQ1, which is for instance a PWM signal, to vary, on the basis of the control voltage Vc value, a quantity within the converter 20 which the power carried by the converter 20 substantially depends on, e.g., the peak primary current in each switching cycle, is implemented by the controller 80 as it is also implemented by the prior art controller 13 shown in FIGS. 1 and 4.

With respect to this burst-mode operation of converter 20, the method here described provides a burst mode operation that further comprises the following steps:

- the method provides that three voltage thresholds, Vth1, Vth2 and Vth3, with Vth1<Vth2<Vth3, are available, as well as a comparison circuit, which may comprise, for example, a comparator with hysteresis using the first and second threshold Vth1, Vth2 as hysteresis threshold and a further comparator for the third threshold Vth3, that compares the control voltage Vc to the three thresholds Vth1, Vth2 and Vth3. Thus, the method provides comparing the control voltage Vc, which is also used to control the output voltage Vout, to the three thresholds Vth1, Vth2 and Vth3. In a normal or running mode the converter 20 performs switching according to the complementary or non-complementary mode and controls $V_{out}$ through Vc (for instance varying the peak current, as mentioned);
- for Vc<Vth1, below the first and lowest threshold, it is entered the burst mode, entering first the idle mode. The switching of the converter 20, driving the half bridge Q1, Q2 in a complementary or non-complementary manner, is stopped, entering an idle mode or state; output voltage $V_{out}$ drops slightly as a consequence, and therefore the control voltage Vc increases;
- when, while the control voltage Vc increases, it happens that it surpasses the second threshold, Vc>Vth2, the switching of the converter 20 restarts (as it comes after an idle interval). The high-side switch Q2 is turned on only in one given switching cycle, p-th cycle or cycle p in the burst, in particular the first switching cycle in the burst, and, in case, being $N_x$ a determined number of switching cycles, is then also turned on every $N_x$ switching cycles starting to count from such one given switching cycle p (which is thus the first switching cycle of the first $N_x$ switching cycles), in the switching cycle occurring first after such determined number of switching cycles $N_x$, e.g., at cycle $N_x$+p, $2N_x$+p, $3N_x$+p, this of course compatibly with the length of the burst, the number $n_{sw}$ of cycles in the burst;
- subsequently, the output voltage $V_{out}$ increases and the control voltage Vc drops; switching is stopped again as Vc<Vth1. Operation repeats itself in this way, if the load of the converter does not significantly increase, so that the control voltage Vc stays below the third threshold Vth3, Vc<Vth3;
- normal operation, running state (with the high side switch Q2 turned on every cycle) is restored when either Vc>Vth3 or the number of switching cycles in a burst exceeds a threshold number $n_{swmax}$. This double restoration option prevents continuous operation with the high side switch Q2 on once in $N_x$ cycles in case the load is such that the control voltage Vc is comprised between the first and third threshold, Vth1<Vc<Vth3, steadily;
- optionally, the high side switch Q2 being ON only once in $N_x$ cycles (in addition to each first cycle) can be enabled depending on the input voltage value at the DC input, e.g., with a low input voltage value only (e.g., such as in US or Japan mains, e.g., 140 Vac), whereas at high input voltage the high side switch Q2 is turned in every cycle of a burst like in normal continuous operation.

In other words, continuous operation with the high side switch Q2 on once in $N_x$ cycles occurs if the control voltage Vc is comprised between the first and third threshold, Vth1<Vc<Vth3, steadily, and if the load has increased a little above the level that was causing burst-mode operation with Vc oscillating between Vth1 and Vth2. If the load (and Vc) fall from a higher value (such that, e.g., Vc>Vth3) to within Vth1 and Vth3, the converter's operation will be continuous with both switches normally operated in each switching cycle. Vc needs to fall below Vth1 to activate operation with the high side switch Q2 on once in $N_x$ cycles.

Figure 6:
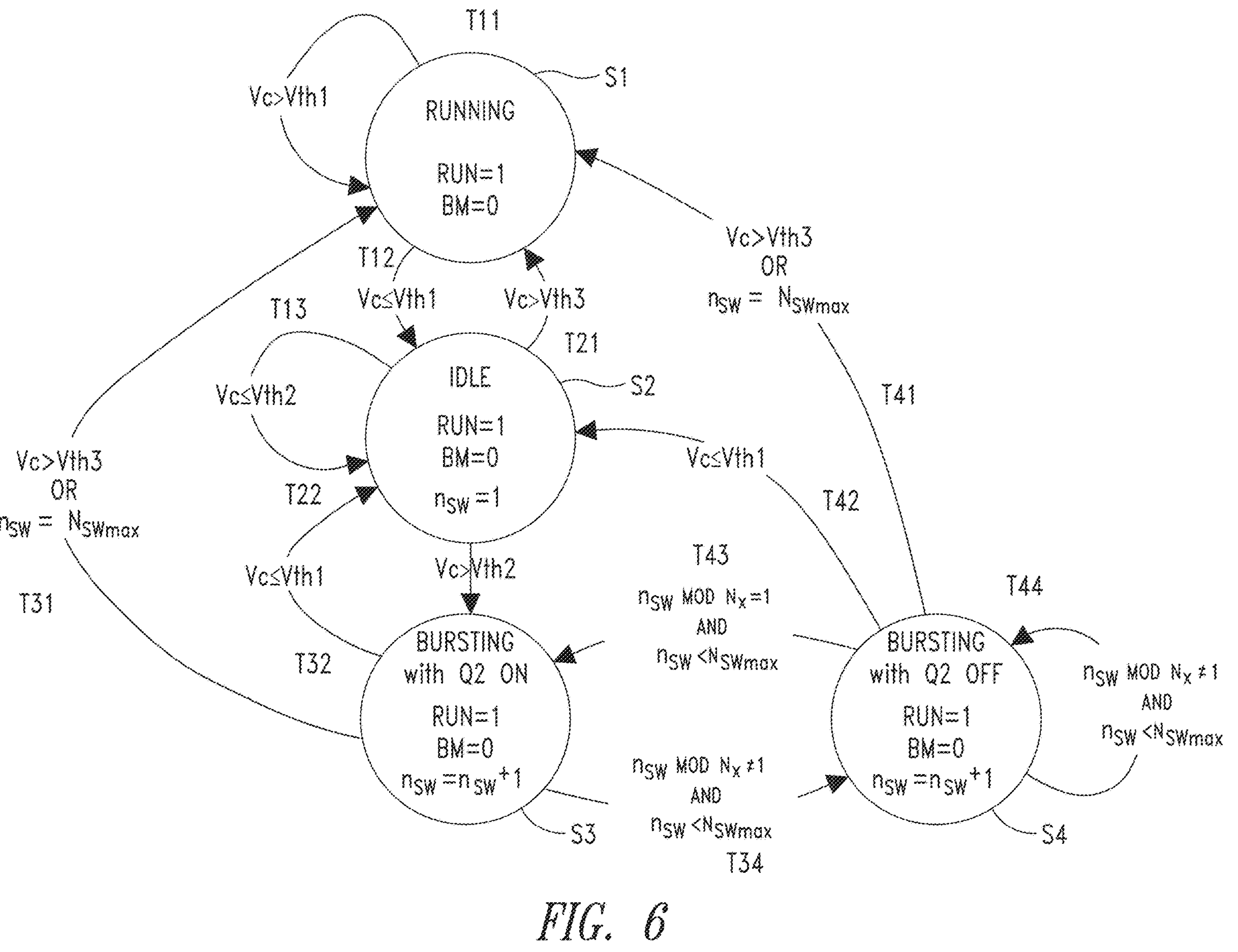
FIG. 6 shows a state diagram representative of an embodiment of a method here described.
Figure 7A:
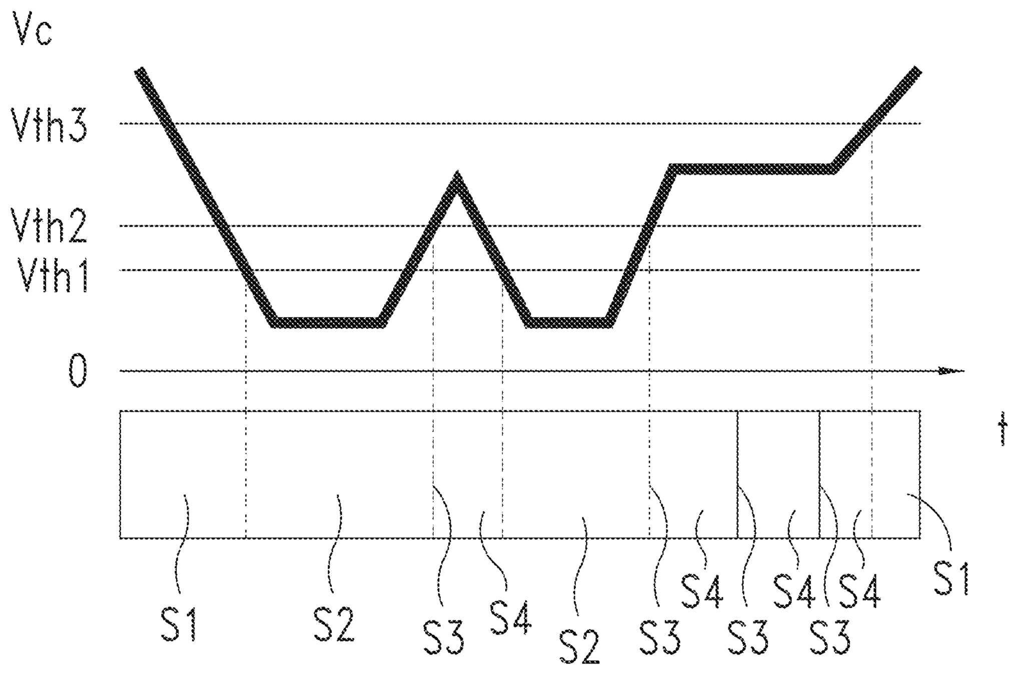
FIG. 7A and FIG. 7B show time diagrams of a control quantity used in an embodiment of a method here described in two different operative conditions.
Figure 7B:
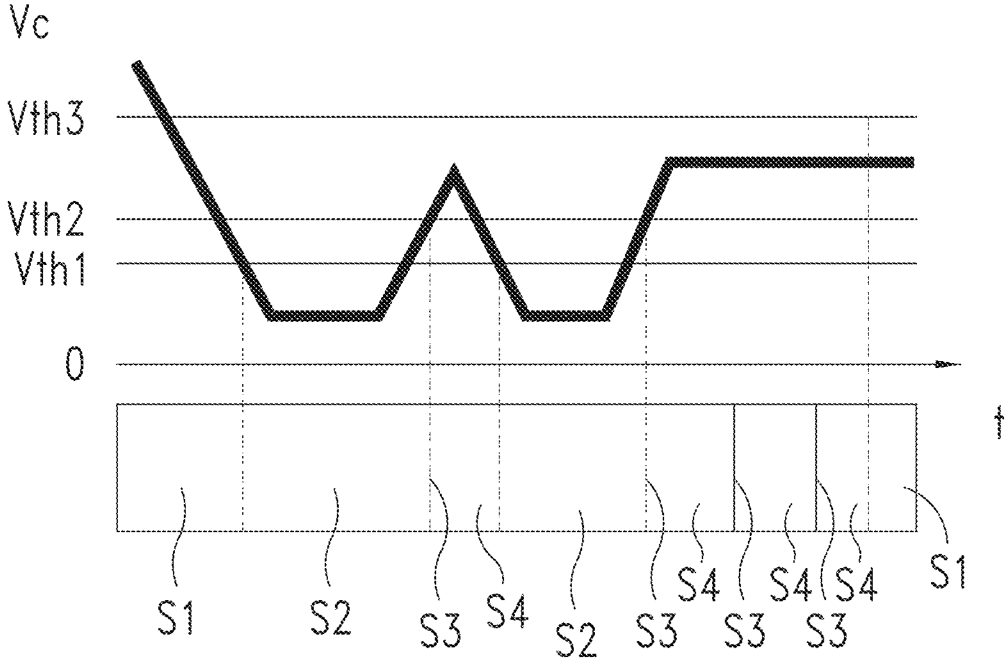

The state diagram shown in FIG. 6 and the timing diagram in FIGS. 7A-7B both illustrate the method.

The circuit implementation of the previously disclosed method as well as the explanation of its operation illustrated in FIGS. 6 and 7 are provided in detail in the description of the example embodiments.

In FIG. 6 it is shown a state diagram, which includes a running state S1, an idle state S2, a bursting state with high side transistor on S3 and a bursting state with high side transistor off S4.

Transition T11 indicates that if Vc>Vth1 the state machine stays in the running state S1, which corresponds to a run flag RUN=1, the converter is switching, and a burst mode flag BM=0, operates in a normal mode performing the switching of Q1 and Q2 in a complementary or non-complementary way.

Transition T12 from state S1 to idle state S2 occurs if Vc≤Vth1. In idle state S2 RUN=0, BM=1, switching is stopped. A variable $n_{sw}$ indicating the number of switching cycles is set to 1.

A reverse transition T21 from idle state S2 to running state S1 takes place if Vc>Vth3, due to a load significant increase.

As indicated by transition T22, while Vc<Vth2 the idle state S2 is maintained. As mentioned, this leads to a drop of the output voltage Vout, so that the control voltage Vc rises.

Transition T23 indicates the control voltage Vc rising above the second threshold voltage Vth2, Vc>Vth2, thus the bursting state with Q2 on is attained. RUN=1 so the converter is switching, and BM=1, it is operating in burst mode. The variable $n_{sw}$ indicating the number of switching cycle is increased by one.

Then, from state S3, if Vc≤Vth1 then a transition T32 back to the idle state S2 is performed.

If Vc>Vth3 or $n_{sw}$=$n_{swmax}$, $n_{swmax}$ being a determined threshold maximum number of switching cycles in a burst, then a transition T31 to the running state S1 is performed. This prevents the converter from running continuously with high-side switch Q2 on once in $N_x$ cycles if the load is such that Vth1<Vc<Vth3.

If $n_{sw}$ MOD $N_x \neq 1$ AND $n_{sw} < n_{swmax}$, the number of switching cycles is such that a remainder of an integer division of such number of number of switching cycles $n_{sw}$ by the determined number of switching cycles $N_x$ is different from one, the value corresponding to the position, specifically the first, in the sequence of switching cycles, at which the high side transistor on is set on, which may be thus once or a multiple of number $N_x$, and it is lower than maximum threshold number of cycles $n_{swmax}$ then a transition T34 from bursting state with high side transistor Q2 on S3 to bursting state with high side transistor off S4 is performed. This transition T34 could be conditioned also to a logic signal revealing that input voltage to converter is in US or Japan range. As better detailed with reference to FIG. 11, if the position p in the sequence of switching cycles of the burst is different from one, it is evaluated if $n_{sw}$ MOD $N_x \neq p$, if the current number $n_{sw}$ of switching cycles in a burst is such that a remainder of an integer division by the predetermined number of switching cycles $N_x$ is different from the value of the given position p in the sequence of switching cycles of the burst which is chosen.

In state S4, RUN=1, BM=1 and the variable $n_{sw}$ indicating the number of switching cycles is increased by one.

State S4 is maintained, by the cycling transition T44, then if $n_{sw}$ MOD $N_x \neq 1$ AND $n_{sw} < n_{swmax}$, the condition for transition T34 holds.

Vice versa, if $n_{sw}$ MOD $N_x = 1$ AND $n_{sw} < n_{swmax}$, the number of switching cycles corresponds to a determined number of cycles $N_x$ over which high side transistor on is on once or a multiple of number $N_x$ and it is lower than $n_{swmax}$, transition back from state S4 to S3 is performed.

If Vc≤Vth1 a transition T42 from state S4 to idle state S2 is performed.

If Vc>Vth3 OR $n_{sw} = n_{swmax}$ state S4 is exited and a transition T41 to running state S1 is performed.

In FIGS. 7A and 7B are shown diagrams representing the evolution of the control voltage Vc in time with the state diagram of FIG. 6. The three thresholds are indicated as horizontal lines.

As shown in FIG. 7A, which refers to a situation in which the converter 20 is exiting from burst mode because Vc>Vth3, the converter 20 starts in running state S1. At the end, the control voltage Vc surpasses the third voltage Vth3, finally thus running state S1 is entered from state S4.

FIG. 7B refers to a situation in which the converter 20 is exiting from burst mode because of the number of switch cycles being greater than the maximum threshold number $n_{swmax}$, (Vc does not surpass Vth3, but final running state S1 is entered anyway from S4).

Thus, based on the above, the solution described here refers to a method for operating in burst mode Active Clamp Flyback converters, comprising a transformer 11 and a switching circuit, Q1, Q2 driven by controller 13, with an active clamp, such as circuit 24, determining a clamp voltage drop between an input terminal node and a clamp node, in particular a voltage drop across the clamp capacitor, such clamp node being coupled between the terminals of a primary winding of said transformer, said switching circuit comprising:

- a high side clamp switch, Q2, coupled between said clamp node CN and said other terminal of said primary winding, and
- a low side transistor Q1 coupled between other terminal of said primary winding of a transformer 11 and ground GN, said high side clamp transistor Q2 and low side transistor Q1 being driven to switch between on and off states, according to a complementary or non-complementary control;
- said high side clamp transistor Q2 and low side transistor Q1 being controlled by a controller 13 on the basis of a control voltage Vc generated by a control loop on the basis of an error signal between an output voltage $V_{out}$ of the converter and a reference voltage,
- said method comprising a burst operation mode in which said high side clamp transistor Q2 and low side transistor Q1 are driven in bursts of switching cycles S3, S4 separated by idle time intervals in which the converter 20 does not switch;
- said method comprising, in burst operation mode S3, S4;
- comparing the control voltage Vc to a set of thresholds comprising at least a first threshold Vth1 a second threshold Vth2 and a third threshold Vth3 of increasing value;
- if the control voltage Vc is smaller than the first threshold stopping the switching, entering idle state S2;
- if the control voltage Vc subsequently become greater than the second threshold Vth2, resuming the switching, turning on the high side clamp switch Q2 only in the first cycle, in the first position p of the sequence of switching cycles counted from the beginning of the burst, p=1, of the switching cycles in the burst including a plurality of switching cycles, and, if the number of subsequent cycles counted from said first cycle in a burst $n_{sw}$ exceeds a predetermined number of switching cycles $N_x$, every subsequent determined number of switching cycles $N_x$ starting from said first cycle of the switching cycles in the burst;
- if the control voltage Vc subsequently becomes greater than the second threshold Vth2 performing a burst, in which in particular switching is resumed, comprising a plurality of switching cycles $n_{sw}$, in which the high side clamp switch Q2 is turned on only in one given cycle p, the first cycle, of the plurality of switching cycles $n_{sw}$ in the burst in a given position, the first, in said plurality of switching cycles $n_{sw}$, and, if a number of cycles in the burst counted starting from said given first cycle exceeds a determined number of switching cycles $N_x$, the high side clamp switch Q2 is turned on every time a determined number of switching cycles $N_x$ is counted starting from said one given first cycle of the switching cycles in the burst in a switching cycle occurring first after said determined number of switching cycles $N_x$;
- passing to normal operation mode S1 if the control voltage Vc is greater than the third threshold Vth3 or the number of cycles in said plurality of switching cycles in a burst exceeds a determined maximum value $n_{swmax}$.

Also, the method may comprise turning on the high side clamp switch Q2 in one given switching cycle, in particular the first switching cycle and, if the number of cycles in a burst exceeds a determined number of switching cycles $N_x$, every determined number of switching cycles $N_x$, depending on the input voltage value of the converter, in particular if the input voltage is equal or lower than a given value.

Figure 2A:
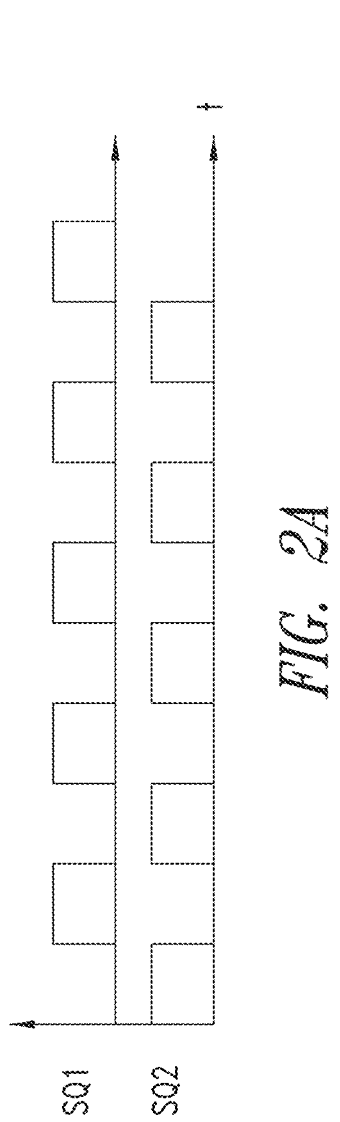
FIG. 2A is a timing diagraming illustrating example control signals used to control an ACF converter using complementary control method.
Figure 2B:
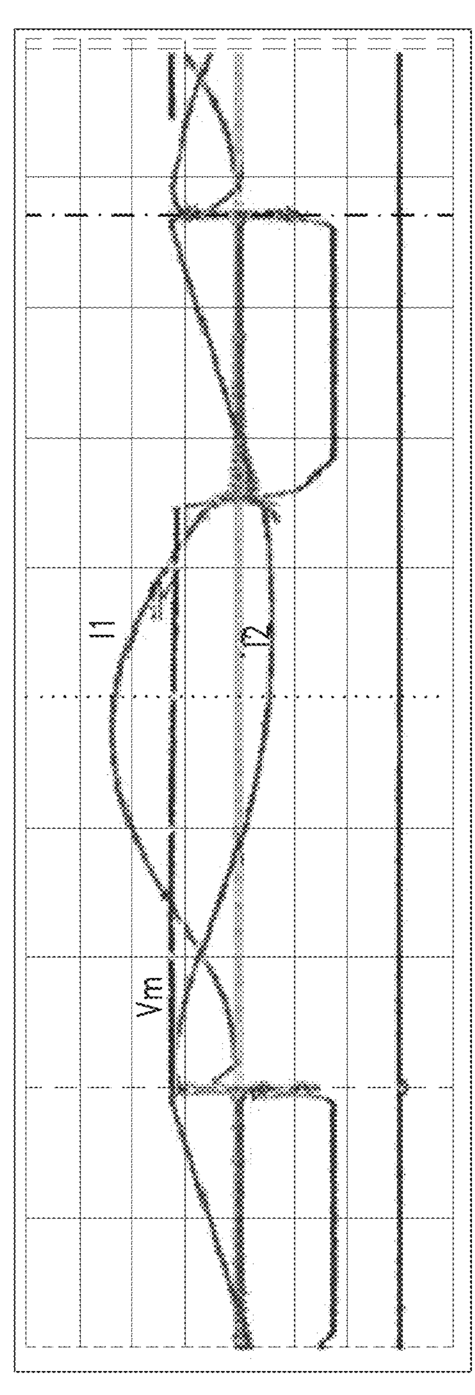
FIG. 2B illustrates example currents and voltages of an ACF converter controlled using a complementary control method.
Figure 3A:
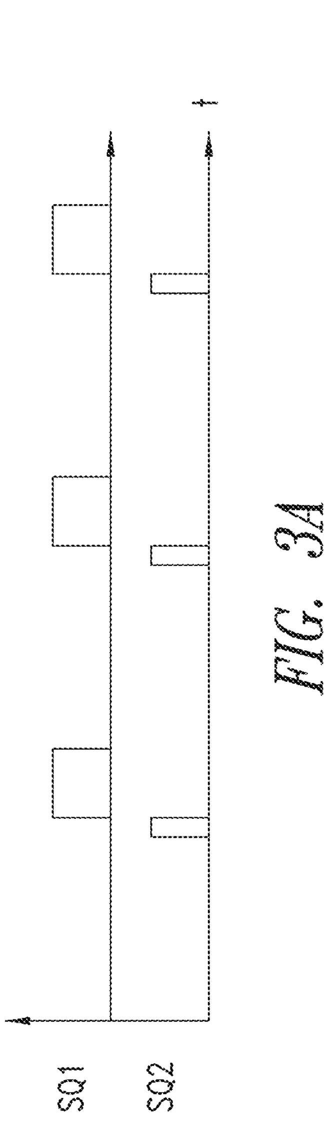
FIG. 3A is a timing diagraming illustrating example control signals used to control an ACF converter using non-complementary control method.
Figure 3B:
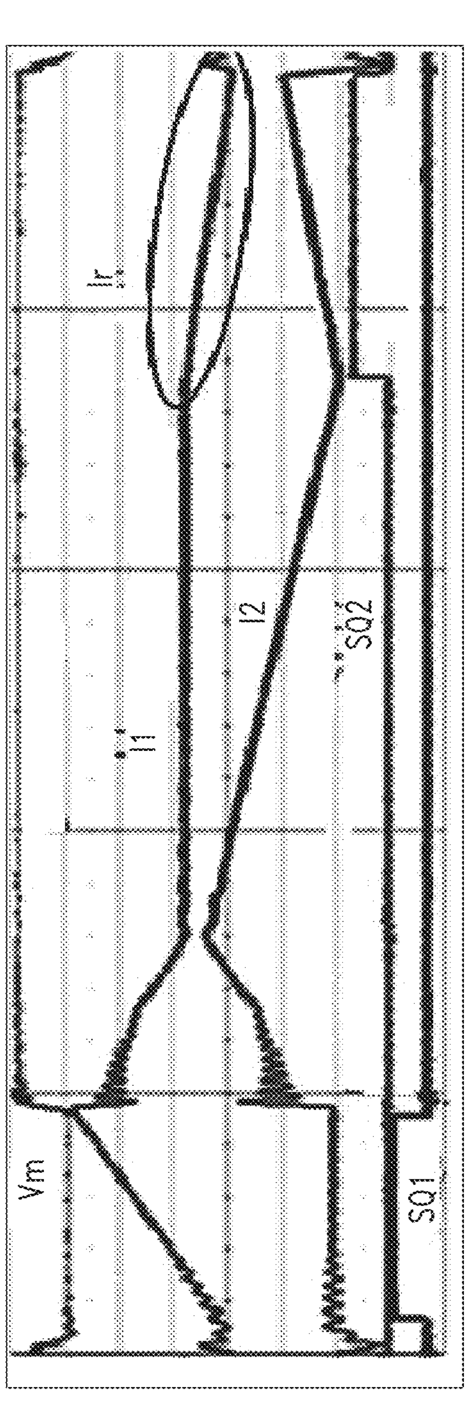
FIG. 3B illustrates example currents and voltages of an ACT converter controlled using a non-complementary control method.
Figure 8:
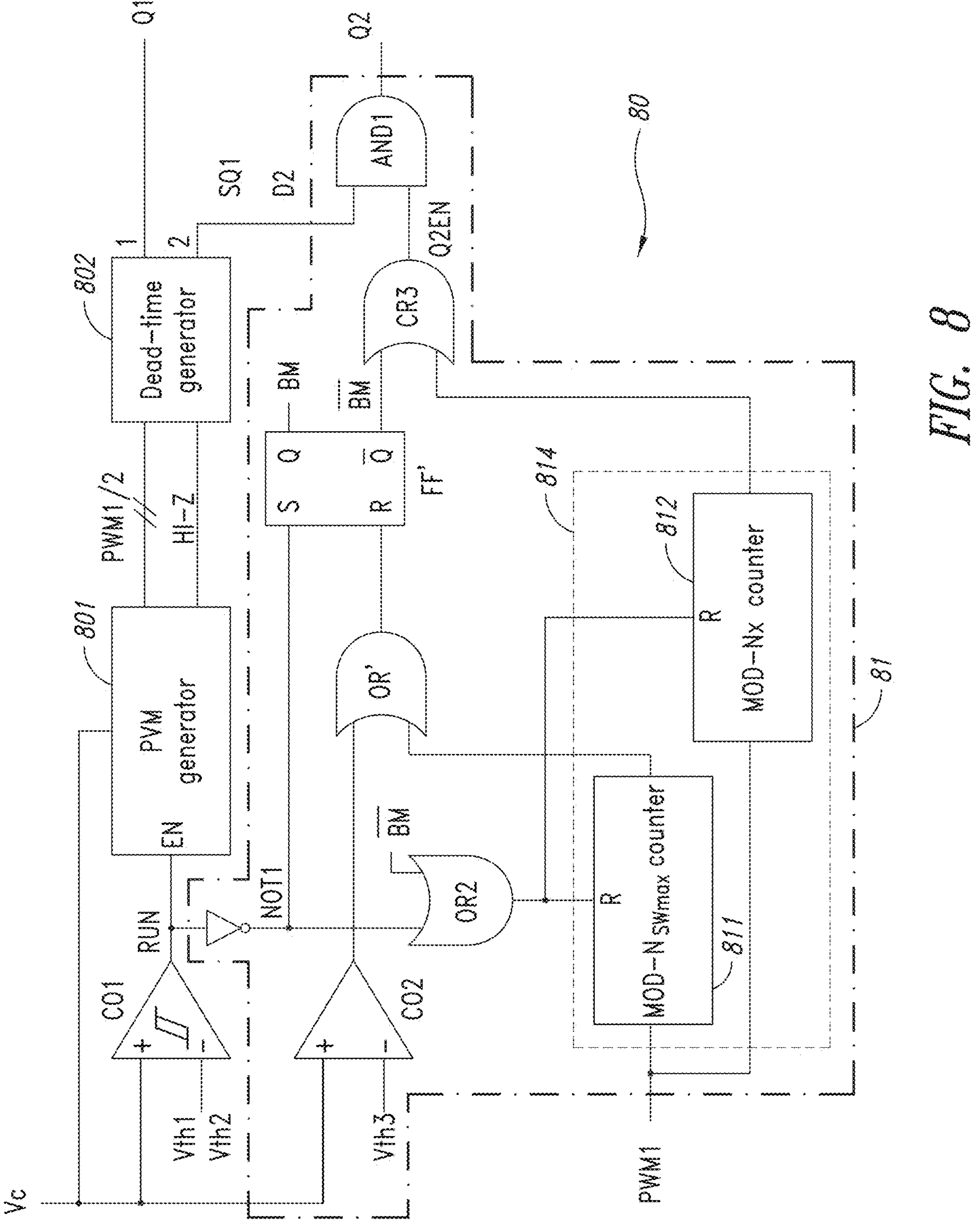
FIG. 8 shows schematically an embodiment of a controller that may be used in the converter of FIG. 5.

In FIG. 8 it is shown an embodiment 80 of the controller circuit implementing the method described with reference to FIGS. 6 and 7. In particular the method is implemented by block 81, while the other components of circuit 80 outside block 81 are standard functional blocks usually found in any ACF controller, like controller 13. A "PWM generator" block 801 generates PWM (Pulse Width Modulated) signals PWM1 and PWM2, which essentially determine the ON/OFF states of transistors or switches Q1 and Q2 (they correspond to SQ1 and SQ2 gate signals), respectively. Signals PWM1 and PWM2 are never both high simultaneously. When the signal PWM1 is high, Q1 is ON, when the signal PWM1 is low Q1 is OFF; when PWM2 is high Q2 is ON, when PWM2 is low Q2 is off. PWM1 and PWM2 are generated in a way depending on whether the PWM generator 801 implements the complementary on the non-complementary control (see the SQ1 and SQ2 signals in FIGS. 2 and 3). The PWM generator 801 also receives the control voltage Vc that normally determines the instant when the signal PWM1, the gate signal of MOSFET switch Q1, is to transition from high to low to turn off low side switch Q1.

The signals PWM1 and PWM2 outputted by the PWM generator 801 are processed by a "Dead-time generator" 802 that inserts a short time interval just after either PWM1 or PWM2 signal go low. During this time interval (called the "dead-time") both outputs SQ1 and SQ2 of the block 802, which are the outputs of the controllers 80 are low, so that switches Q1 and Q2 are OFF. This function is for the ACF converter to achieve ZVS at turn-on of both switches Q1 and Q2 because it provides the time to the midpoint of the Q1/Q2 leg to transition rail-to-rail.

A comparator with hysteresis CO1 is the one normally implementing burst-mode operation, receiving at input the control voltage Vc and the first threshold Vth1 and the second threshold Vth1 as its hysteresis thresholds. When the control voltage Ve is greater than the first threshold Vth1 the running mode signal RUN or flag is high, the PWM generator 801 is enabled and provides the PWM signals PWM1 and PWM2 to the Dead-time generator 802. A high impedance logic signal HI-Z, also outputted by generator 801 to the dead time generator 802, is low, so that switches Q1 and Q2 are driven continuously.

When the control voltage Vc falls below the first threshold Vth1 the running mode signal RUN goes low, the PWM generator 802 is disabled and asserts the signal HI-Z high which keeps low both driving signals SQ1 and SQ2, so that both switches Q1 and Q2 are OFF. The hysteresis of the first comparator CO1 causes the running mode signal RUN to go high and switching to restart when the control voltage Vc exceeds a second threshold Vth2>Vth1.

The circuit 81 is configured to condition the signal intended to determine the turn on and turn-off states of the high side switch Q2 to fulfill the operation illustrated in the state diagram of FIG. 6 and the time diagram of FIG. 7.

The circuit 81 receives as inputs the control voltage Vc and the running mode signal RUN, negated by a NOT logic gate NOT1, and supplies a switch Q2 enable signal Q2EN, which conditions the gate signal SQ2 that is provided the floating driver of the high side switch Q2, in particular via a AND gate AND1 which receives as input the Q2 enable signal Q2EN and the PWM signal PWM2 for the switch Q2, or its version with dead time inserted by block 802, D2, as in the example of FIG. 8.

The circuit 81 includes two counters, a MOD-$n_{swmax}$ counter 811 and a MOD-$N_x$ counter 812, that are disabled and kept in a "reset at zero" state by a high logic level applied at their reset input R. They are shown in a common area 814 because they can be realized as a single block outputting two signals, but for the clarity of the present explanation they are considered as distinct blocks.

The output of the MOD-$n_{swmax}$ counter 811 is low as long as the number of PWM cycles (e.g., of rising edges) of the PWM1 signal) counted from the last reset at zero is less than the maximum number of cycles $n_{swmax}$, a number that is internally set fixed at an appropriate value; as the number $n_{sw}$ of counted PWM cycles equals $n_{swmax}$ the output of the counter 811 goes high.

The output of the MOD-$N_x$ counter 812 in the example shown is high in the first counted cycle after it has been reset (as discussed in the following the reset signal may be delayed to have the MOD-$N_x$ counter 812 go high after p cycles) and low in the remainder $N_x-1$ cycles, where $N_x$ is a number internally fixed at an appropriate value $<n_{swmax}$, lower than the maximum number $n_{swmax}$, such number $N_x$ determining the frequency with which the high side switch Q2 is on.

As the number $n_{sw}$ of counted PWM cycles equals $N_x$ the counter 812 resets itself at zero. In this way, the output of the counter is high in the first, the $N_x+1$, the $2N_x+1$ ($N_x+p$, $2N_x+p$, etc., if the first turning on of switch Q2 happens during the p-th cycle), etc. switching cycle after its reset input has been asserted low, thus realizing the transition condition $n_{sw}$ MOD $N_x=1$ ($n_{sw}$ MOD $N_x=p$ if the first turning on of switch Q2 happens during the p-th cycle), shown in the state diagram of FIG. 6 for transition T43.

The circuit 81 also includes a second comparator CO2 that compares the control voltage Vc to a third threshold voltage Vth3>Vth2>Vth1, an edge-triggered SR latch, FF1, and a few logic gates NOT1, OR1, OR2, OR3, AND1, which will be illustrated in the following.

To describe the operation of the circuit, it is assumed here that the initial load conditions of the ACF converter are such that Vc>Vth3 (as shown in the FIGS. 7A, 7B). The output of the first comparator CO1, which is the flag RUN is high, so the PWM generator 801 is active, the signal HI-Z is low, and the Dead-time generator 802 is outputting its signals SQ1 (as it is directly the gate signal of switch Q1) and D2 which then is used to obtain the gate signal SQ2 of switch Q2 through the logic gate AND1). The output of the second comparator CO2 is high too and such is the output of the OR gate OR1, which two inputs are coupled to the output of the second comparator CO2 and to the output of the counter 811. Therefore, the reset input R of the Set Reset latch FF1, which is coupled to the output of the OR gate OR1, is high whereas its set input S, which is the output of a NOT gate NOT1, coupled to the output of the first comparator CO1 and thus equal to $\overline{RUN}$, is low. Set Reset latch FF1 is then in its reset state, with its output Q=BM, flag indicating the burst mode, low and negated output $\overline{Q}=\overline{BM}$ high. The output of a OR gate OR3 (Q2 enable signal Q2EN), which has for inputs $\overline{BM}$ and the output of counter 812, is high too and the output of the AND gate AND1, having for inputs the Q2 enable signal Q2EN and the output D2 of the dead-time generator block 802 driving the high side switch Q2 equals such output O2. Therefore, the two switches Q1, Q2 are turned on and off in every switching cycle according to the implemented control method (complementary or not).

Being the negated burst mode flag $\overline{BM}$ high, the output of the OR gate OR2, having for inputs $\overline{RUN}$ and $\overline{BM}$ is high too and the two counters, of which the output of OR2 is the reset signal, are both kept in the reset state with their outputs low.

Now, assuming that the converter load decreases up to the point that the control voltage Vc falls below Vth1, this causes the output of the first comparator CO1, the RUN signal, to go low. This disables the PWM generator 801 that sets high the high impedance signal HI-Z so that both outputs of the Dead-time generator 802 go low. Switches Q1 and Q2 are then both OFF and the converter is stopped. At the same time, the output of the NOT gate NOT1 goes high; the output of the second comparator CO2 low is too and so is the output of the MOD-$n_{swmax}$ counter 811, thus the latch FF1 is set and its Q output, the internal variable BM, goes high. Being $\overline{BM}$ low, Q2 enable signal Q2EN equals the output of the MOD-$N_x$ counter 812. The two counters 811 and 812 remain in their reset state due to the output of NOT1 being high.

Since the converter is stopped, no energy is delivered to the output, thus the output capacitor Cout is discharged by the load current, and the output voltage Vout decays. This is sensed by the control loop that reacts increasing the control voltage Vc. As the control voltage Vc exceeds Vth2, the running mode signal RUN goes back high, reactivating the PWM generator 801 and therefore restarting the switching activity of Q1 and Q2.

At the same time, the output of NOT gate NOT1 going low unblocks the two counters 811, 812, which start counting switching cycles. Both inputs of gate OR1 are low, thus the latch FF1 stays in its set state and burst modes signals BM and $\overline{BM}$ keep their level (high and low, respectively). In the first switching cycle after the running signal RUN goes high the output of the MOD-$N_x$ counter is high, so the clamp enable signal Q2EN is high and clamp high side switch Q2 can turn-on as the Dead-time generator 802 asserts high its corresponding output SQ2. In the subsequent cycles, until the $N_x$-th cycle, the output of the MOD-$N_x$ counter 812 is low, the clamp enable signal Q2EN is low too and clamp high side switch Q2 will not be turned on.

As a result of the switching activity restart, the energy delivered to the output replenishes the output capacitor Cout, and the output voltage Vout increases. This is sensed by the control loop that reacts decreasing the control voltage Vc. Since the load has not changed, after some time the control voltage Vc falls again below the first threshold Vth1 and running mode flag RUN goes low stopping the converter 50 and causing the same sequence of events previously described.

Figure 9:
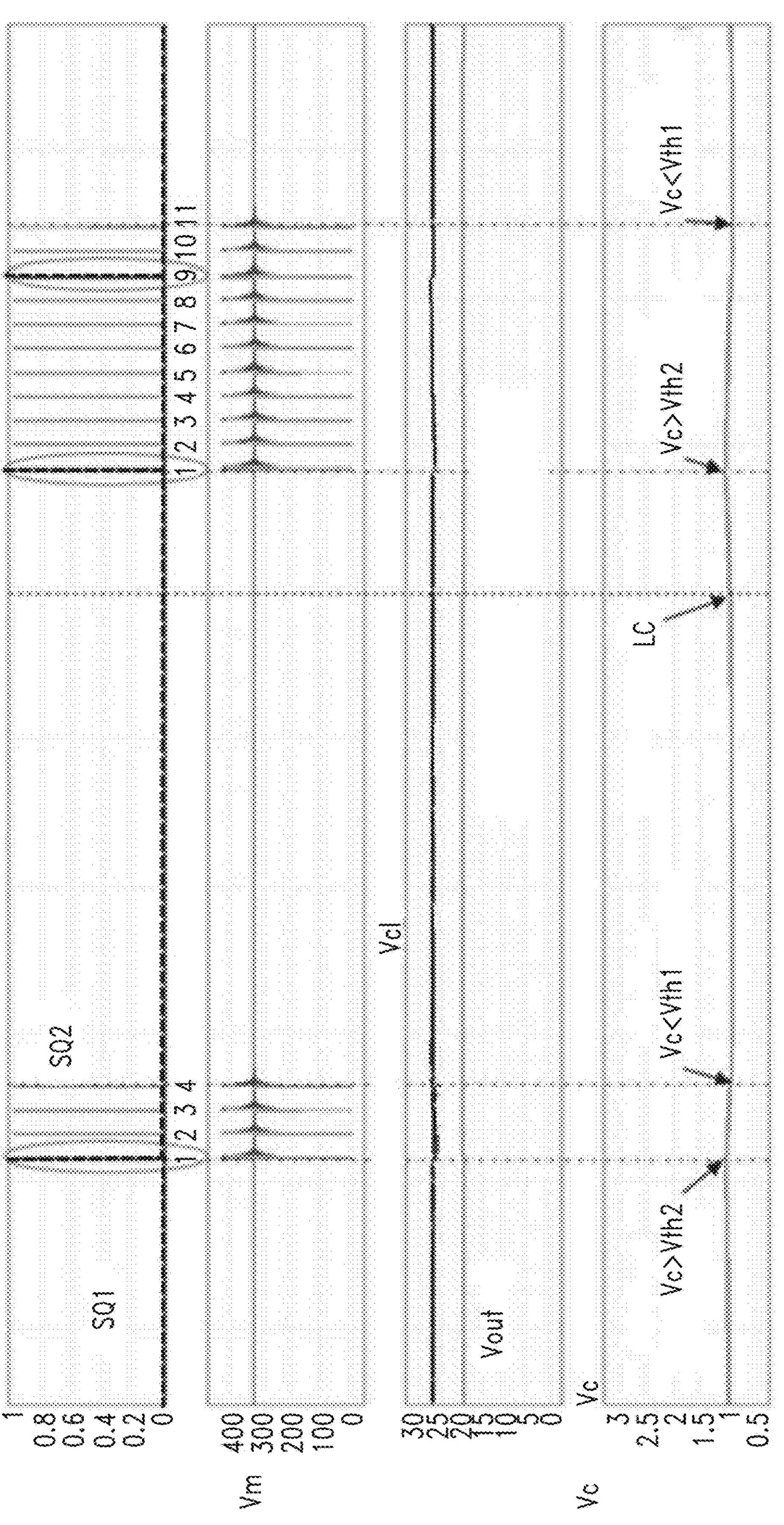
FIGS. 9 and 10 show time diagrams representing simulation of the time evolution of quantities in a converter operating according to an embodiment of a method here described.

If, considering an extremely light load condition, during this time interval of switching activity the total number $n_{sw}$ of switching cycles in a burst is lower than the predefined number $N_x$, the clamp high side switch Q2 is turned on only once, in the first cycle of the burst; if, considering a higher load level, $n_{sw}>N_x$, clamp high side switch Q2 is turned on 1+INT[/$N_x$] times, where the function INT returns the greatest integer less than or equal to the argument. The turn-on occurs in those cycles fulfilling the condition $n_{sw}$ MOD $N_x$=1 ($n_{sw}$=1, $N_x$+1 . . . m*$N_x$+1, with m positive integer). This behavior is illustrated by the key waveforms in FIG. 9, showing key waveforms of an ACF converter embedding the control circuit illustrated in FIG. 8 when the load, at the point indicated with LC, changes from 1% to 5% of the rated load, causing the system to operate from 4 switching cycles per burst to 11 switching cycles per burst.

Under this view it is observed that from the circuits described, by way of example an approximate relationship that provides the number $n_{sw}$ of switching cycles per burst may be expressed as the following:

$$n_{sw} = \frac{(V_{th2} - V_{th1})Cout}{Qc\bar{f}_{sw} - Iout}\bar{f}_{sw}$$

where, as indicated above, $C_{out}$ is the output capacitance, $\bar{f}_{sw}$ is the average switching frequency during burst mode, Qc is the per-cycle electric charge delivered to the output, which depends on converter's dc gain when Vc=($V_{th1}$+$V_{th2}$)/2, and Iout is the DC output current at the output node Vout. This is determined by the behavior of the converter operated in burst mode when the load increases.

Assuming that, starting from a light load condition where the converter works in burst-mode as previously described, alternating time intervals where the converter is switching to time intervals where it is stopped, the load is increased to a point such that the control voltage Vc does not fall below the first threshold Vth1 anymore. As a result, the converter runs continuously.

There are two possible cases: 1) the new load condition is such that the control voltage Vc settles at a value greater than the third threshold Vth3; 2) the new load condition is such that the control voltage Vc settles at a value between Vth2 and Vth3.

In the first case, as Vc>Vth3 the output of the second comparator CO2 goes high, causing the output of OR gate OR1 to go high too, which resets the latch FF1. Burst mode flag BM goes low and negated burst mode flag $\overline{BM}$ goes high, so that enable signal Q2EN goes high irrespective of the output of the MOD-$N_x$ counter 812. Therefore, clamp switch Q2 is driven in every cycle as required when the converter runs continuously. As negated burst mode flag $\overline{BM}$ goes high, the output of OR GATE OR2 goes high too and the two counters 811 and 812 are reset at zero and do not count anymore.

In the second case, the output of the second comparator CO2 remains low, and the converter 20 keeps on running turning on the high side switch Q2 only in those cycles fulfilling the condition $n_{sw}$ MOD $N_x$=1 until $n_{sw}$=$n_{swmax}$. As this occurs, the output of the MOD-$n_{swmax}$ counter 811 goes high causing the output of OR gate OR1 to go high too, which resets latch FF1 an produces the same series of events as in the previous case, resulting in the high side switch Q2 driven in every cycle as required when the converter runs continuously.

The only visible difference between the two cases is the number of switching cycles where the high side Q2 is turned on once in every $N_x$ cycles from the last idle period: in the first case it is less than $n_{swmax}$, in the second case it equals $n_{swmax}$.

Figure 10:
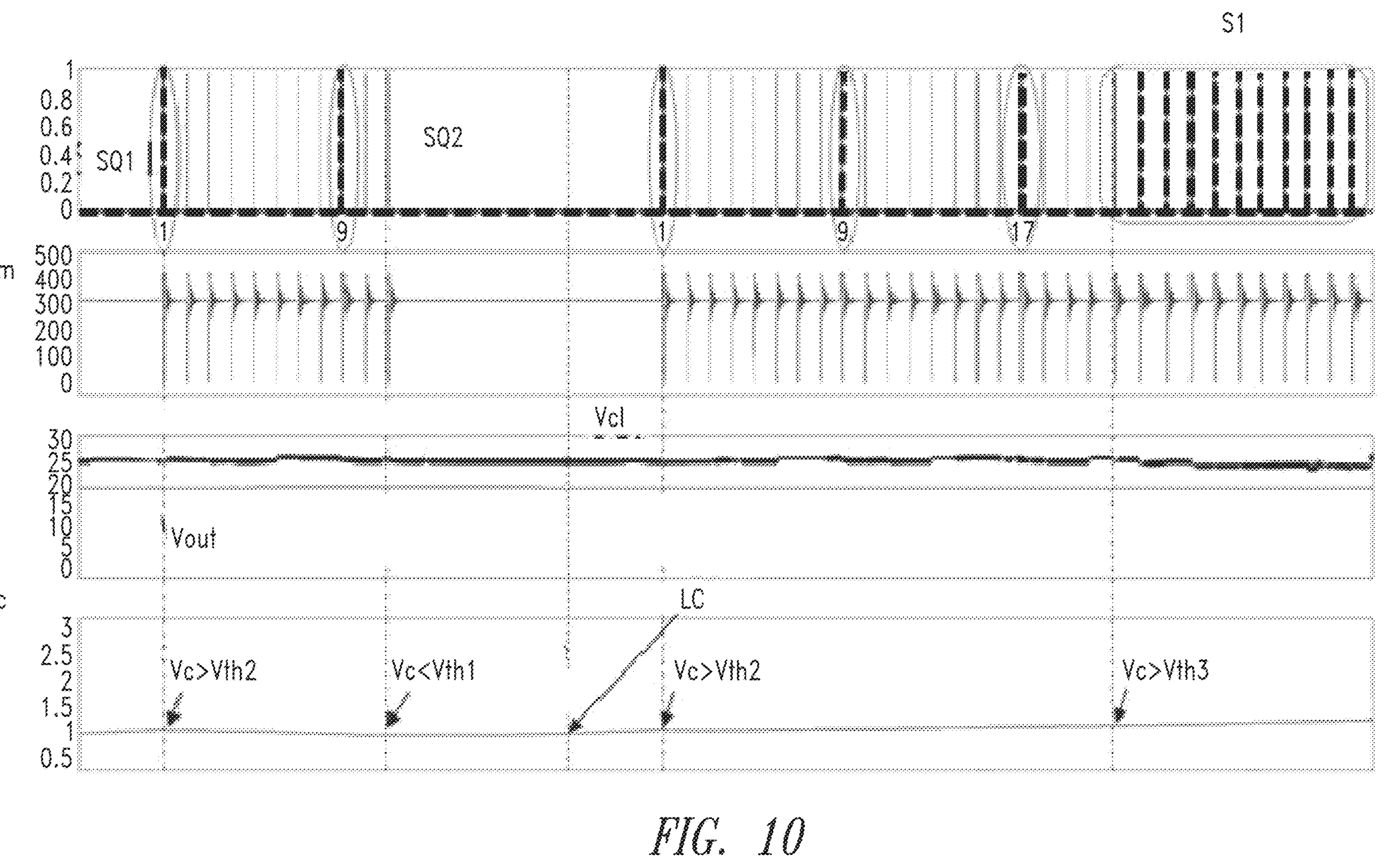

The waveforms shown in FIGS. 9 and 10-Q1 and Q2 gate signals SQ1, SQ2, midpoint voltage Vm, output voltage Vout, control voltage Vc and clamp voltage Vclamp referred to the secondary winding, the clamp voltage Vclamp multiplied by the ratio N2:N1, which are the number of turns of the secondary to the primary winding, which has to be greater than the output voltage in order for a current to flow while the high side switch Q2 is on—have been obtained by simulating an exemplary ACF converter, whose basic electrical specification is provided in Table I below, also with the objective of assessing the benefits offered by the function described in the present disclosure. To do so, the converter has been simulated also omitting the function (with the high side switch Q2 driven in every cycle also during burst-mode operation) and using a hybrid clamp like the one shown in FIG. 4A and, additionally, not turning on the high side switch Q2 at all during burst-mode operation.

The comparison has been made looking at the input power to the converter and the voltage across the clamp capacitor Cc at light load (1% of the rated load) at low and high input voltage.

The results of these simulation are shown in the tables II and III. A DC input voltage corresponding to the lowest input voltage to the converter and a DC input voltage $Vin_{dc}$ corresponding to the nominal European mains voltage have been considered.

TABLE I

| Main Electrical Specification of the Exemplary ACF Converter | | | |
|---|---|---|---|
| Parameter | Symbol | Value | Unit |
| Ac input voltage range | $V_{in,min}$-$V_{in,max}$ | 88-264 | Vac |
| Output voltage range | $V_{out,min}$-$V_{out,max}$ | 5-20 | Vdc |
| Rated output power | $P_{out}$ | 65 | W |
| Primary inductance | $L_p$ | 80 | μH |
| Primary leakage inductance | $L_{p,lk}$ | 2 | μH |
| Primary-to-secondary turn ratio | n | 4 | — |
| Clamp capacitor | $C_{CL}$ | 470 | nF |

TABLE II

| Input Power to the Converter [W] | | | |
|---|---|---|---|
| Vindc | Q2 turned on in every cycle | Q2 always off | Solution here described |
| 100 | 0.959 | 0.934 | 0.871 |
| 325 | 1.020 | 1.015 | 0.924 |

TABLE III

| Dc Voltage Across Clamp Capacitor [V] | | | |
|---|---|---|---|
| $Vin_{dc}$ | Q2 turned on in every cycle | Q2 always off | Solution here described |
| 100 | ≈106 | ≈140 | ≈120 |
| 325 | ≈102 | ≈120 | ≈108 |

Figures 4A, 4B:
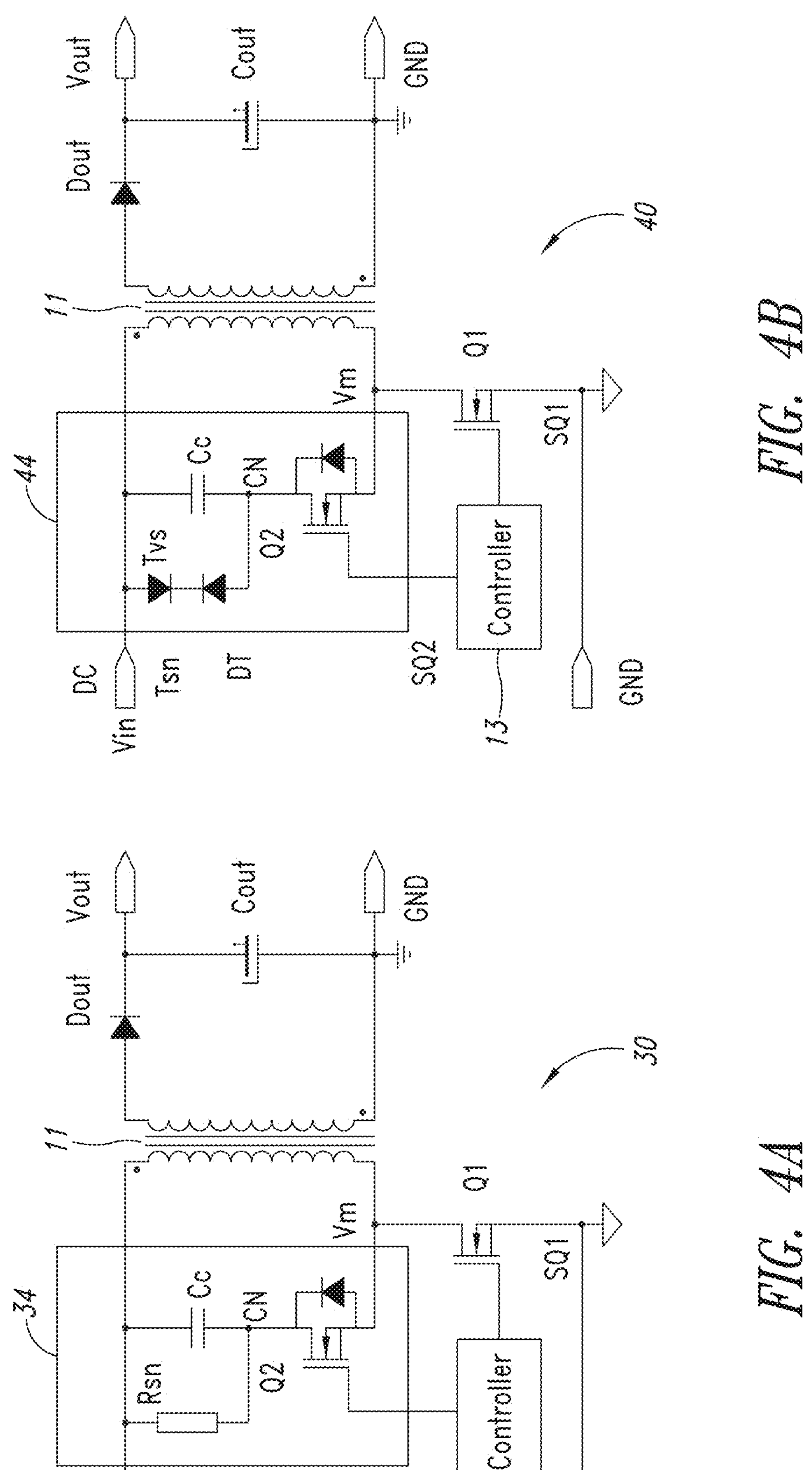
FIG. 4A is a schematic diagram of a hybrid clamp flyback converter.
FIG. 4B is a schematic diagram of a hybrid clamp flyback converter having a transient voltage suppressor (TVS)

As indicated, the simulation results of the solution here described in the last column of a Table II and III refers to an architecture like the one of FIG. 5 with a controller like the one of FIG. 8 where the flyback converter uses a hybrid clamp circuit, like the circuit 34 shown in FIG. 4A.

These results confirm that the proposed solution is beneficial in terms of both power saving and ability to keep the voltage across the clamp capacitor under control.

The one previously described is just one possible implementation of the proposed solution. It is worth mentioning that the algorithm lends itself to design implementations by means of an automated synthesis tool.

In the description, the values $N_x$ and $n_{swmax}$ are fixed internally. Optionally they can be user-programmable or adjustable on-the-fly by some self-calibration procedure (e.g., a lookup table that optimizes those numbers according to a determined map of converter operating conditions or making them depend on the number $n_{sw}$ of switching cycles counted in a burst).

Turning on the high side transistor in the first cycle of the burst is the exemplary embodiment of the method. However, in general, if the control voltage subsequently becomes greater than the second threshold Vth2, may resume the switching, with the high side clamp switch Q2 turned in the p-th switching cycle in a burst including a plurality of switching cycles $n_{sw}$>p, and, if the number of cycles $n_{sw}$ in a burst exceeds a determined number of switching cycles $N_x$ by p−1, every determined number of switching cycles $N_x$ starting from said p-th cycle in the burst. In other words, given the determined number of switching cycles $N_x$, the method provides to turn on the high side clamp switch Q2 in the p-th cycle of the burst, then every $N_x$ cycles starting from the cycle p-th, provided there are more than $N_x$+p−1 cycles in a burst.

A possible embodiment may comprise providing a logic circuit defining a minimum number Nmin of switching cycles which are performed in each burst, e.g., Nmin=3, and the high side clamp switch Q2 is turned on in a determined cycle p, where p can be 1 or 2 or 3, which means p<=Nmin, and then, if the burst continues for a sufficient number of switching cycles, after the subsequent $N_x$ cycles. For instance, if p=2 and $N_x$=8, the high side clamp switch Q2 is turned on during the second, tenth, eighteenth, etc . . . , cycle, more in general during the cycles of index m*$N_x$+p, at least as long as m*$N_x$+p<$n_{sw}$max.

Therefore, in general the method here described may comprise, in burst operation mode, comparing the control voltage Vc to a set of thresholds comprising at least a first threshold Vth1 a second threshold Vth2 and a third threshold Vth3 of increasing value, and if, when in normal operation mode S1, the control voltage Vc is smaller than the first threshold Vth1 stopping the switching, entering idle state S2, if the control voltage Vc subsequently becomes greater than the second threshold Vth2 performing a burst comprising a plurality of switching cycles $n_{sw}$, in which the high side clamp switch Q2 is turned on only in one given cycle p of the plurality of switching cycles $n_{sw}$ in the burst in a given position p in said plurality of switching cycles $n_{sw}$, and, if a number of cycles in the burst $n_{sw}$ counted starting from said given cycle p exceeds a determined number of switching cycles $N_x$, the high side clamp switch Q2 is turned on every time a determined number of switching cycles $N_x$ is counted starting from said one given cycle p of the switching cycles in the burst in a switching cycle occurring first after said determined number of switching cycles $N_x$;

passing to normal operation mode S1 if the control voltage Vc is greater than the third threshold Vth3 or the number of cycles in said plurality of switching cycles in the burst exceeds a determined maximum value $n_{swmax}$.

Figure 11:
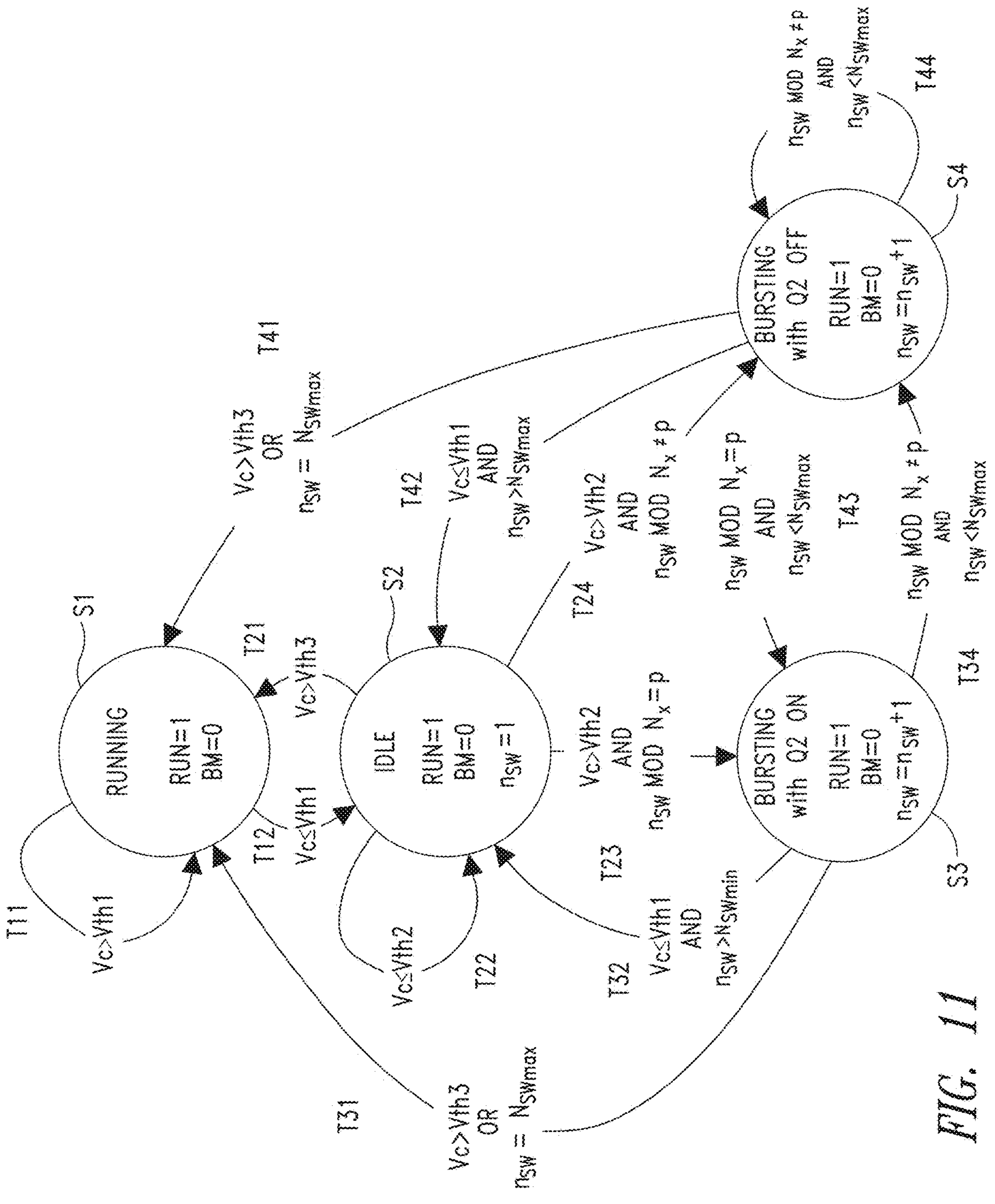
FIG. 11 shows a state diagram representative of a general embodiment of a method here described.

In FIG. 11, to this regard it is shown a state diagram, which corresponds to the one of FIG. 6, however, here the position of the given cycle for which the bursting state with high side transistor on S3 is maintained with Q2 is indicated as a generic position p, not necessarily, the first cycle after Vc>Vth2. Thus the state diagram also includes a running state S1, an idle state S2, a bursting state with high side transistor on S3 and a bursting state with high side transistor off S4.

Transition T11 indicates that if Vc>Vth1 the state machine stays in the running state S1, which corresponds to a run flag RUN=1, the converter is switching, and a burst mode flag BM=0, operates in a normal mode performing the switching of Q1 and Q2 in a complementary or non-complementary way.

Transition T12 from state S1 to idle state S2 occurs if Vc≤Vth1. In idle state S2 RUN=0, BM=1, switching is stopped. A variable $n_{sw}$ indicating the number of switching cycle is set to 1.

A reverse transition T21 from idle state S2 to running state S1 takes place if Vc>Vth3, due to a load significant increase.

As indicated by transition T22, while Vc<Vth2 the idle state S2 is maintained. As mentioned, this leads to a drop of the output voltage Vout, so that the control voltage Vc rises.

Transition T23 indicates the control voltage Vc rising above the second threshold voltage Vth2, Vc>Vth2, AND $n_{sw}$ MOD $N_x$=p, thus the bursting state with Q2 on S3 is attained. RUN=1, so the converter is switching, and BM=1, it is working in burst mode. The variable $n_{sw}$ indicating the number of switching cycles is increased by one.

If the control voltage Vc is greater than the second threshold Vth2 but the number of counted switching cycles $n_{sw}$ is such that $n_{sw}$ MOD $N_x \neq p$, the transition T24 to the bursting state with high side switch off S4 is performed; also in this state RUN=1, so the converter is switching, and BM=1, it is working in burst mode. The variable $n_{sw}$ indicating the number of switching cycles is increased by one. This transition T24 could be conditioned also to a logic signal revealing that input voltage to converter is in US or Japan range.

Then, restarting the flow of operation from state S3, if Vc≤Vth1 AND the number of counted switching cycles $n_{sw}$ is greater than the minimum number of switching cycles in a burst $n_{sw}$min, then a transition T32 back to the idle state S2 is performed.

If Vc>Vth3 or $n_{sw}=n_{swmax}$, $n_{swmax}$ being a determined maximum number of switching cycles in a burst, then a transition T31 to the running state S1 is performed. This prevents the converter from running continuously with high-side switch Q2 on once in $N_x$ cycles if the load is such that Vth1<Vc<Vth3, as described above and shown in FIG. 6.

If $n_{sw}$ MOD $N_x \neq p$ AND $n_{sw}<n_{swmax}$, the number of switching cycles does not correspond to a determined number of cycles $N_x$ over which high side transistor on is on once or a multiple of number $N_x$ and it is lower than maximum number of cycles $n_{sw}$max then a transition T34 from bursting state with high side transistor Q2 on S3 to bursting state with high side transistor off S4 is performed. This transition T34 could be conditioned also to a logic signal revealing that input voltage to converter is in US or Japan range.

As previously stated, in state S4, RUN=1, BM=1 and the variable $n_{sw}$ indicating the number of switching cycles is increased by one.

State S4 is maintained, by the cycling transition T44, then if $n_{sw}$ MOD $N_x \neq p$ AND $n_{sw}<n_{swmax}$, the condition for transitions T34/T24 holds.

Vice versa, if $n_{sw}$ MOD $N_x=p$ AND $n_{sw}<n_{swmax}$, the number of switching cycles corresponds to a determined number of cycles $N_x$ over which high side transistor on is on once or a multiple of number $N_x$ and it is lower than $n_{swmax}$, transition back from state S4 to S3 is performed.

If Vc≤Vth1 AND the number of counted switching cycles $n_{sw}$ is greater than the minimum number of switching cycles in a burst $n_{sw}$min a transition T42 from state S4 to idle state S2 is performed.

If Vc>Vth3 OR $n_{sw}=n_{swmax}$, state S4 is exited and a transition T41 to running state S1 is performed. The described solution thus has several advantages with respect to the prior art solutions.

The solution proposed operates an ACF converter in burst-mode so that losses associated to driving high-side switch Q2 are minimized, while clamp voltage is prevented from drifting high uncontrolled without an external resistor.

The solution proposed advantageously provides sensing a voltage referred to ground, thus it does not require additional pins and it does not require additional components, with respect to solution which sense voltages referred to high voltage lines.

Of course, without prejudice to the principle of the disclosure, the details of construction and the embodiments may vary widely with respect to what has been described and illustrated herein purely by way of example, without thereby departing from the scope of the present disclosure.

A method for operating in burst mode Active Clamp Flyback converters, may be summarized (with example references to the drawings) as including a transformer (11) and a switching circuit, (Q1, Q2), with an active clamp circuit (24) determining a clamp voltage drop between an input terminal node (Vin) and a clamp node (CN), coupled between the terminals of a primary winding of said transformer (11), said switching circuit including a high side clamp switch (Q2) coupled between said clamp node (CN) and said other terminal of said primary winding, and a low side switch (Q1) coupled between other terminal of said primary winding of a transformer (11) and ground (GND), said high side clamp switch (Q2) and low side switch (Q1) being driven to switch between on and off states, in particular according to a complementary or non-complementary control, said high side clamp switch (Q2) and low side switch (Q1) being controlled by a controller (13; 80) on the basis of a control voltage (Vc) generated by a control loop on the basis of an error signal between an output voltage ($V_{out}$) of the converter and a reference voltage, said method including a normal operation mode (S1) in which said controller (13; 80) continuously performs the switching of said switches (Q1, Q2) and a burst operation mode in which said controller (13; 80) drives said high side clamp switch (Q2) and low side switch (Q1) in bursts of switching cycles (S3, S4) separated by idle time intervals (S2) during which the converter (20) does not perform the switching of said switches (Q1, Q2), said method including implementing a burst operation mode (S3, S4), by comparing the control voltage (Vc) to a set of thresholds including at least a first threshold (Vth1) a second threshold (Vth2) and a third threshold Vth3) of increasing value, and if, when in normal operation mode (S1), the control voltage (Vc) is smaller than the first threshold (Vth1) stopping the switching, entering idle state (S2), if the control voltage (Vc) subsequently becomes greater than the second threshold (Vth2) performing a burst including a plurality of switching cycles ($n_{sw}$), in which the high side clamp switch (Q2) is turned on only in one given cycle (p) of the plurality of switching cycles ($n_{sw}$) in the burst in a given position (p) in said plurality of switching cycles ($n_{sw}$), and, if a number of cycles in the plurality of switching cycles ($n_{sw}$) in the burst counted starting from said given cycle (p) exceeds a predetermined number of switching cycles ($N_x$), the high side clamp switch (Q2) is turned on, every time said predetermined number of switching cycles ($N_x$) is counted starting from said one given cycle (p) of the switching cycles in the burst, in a switching cycle occurring first after said predetermined number of switching cycles ($N_x$); passing to normal operation mode (S1) if the control voltage (Vc) is greater than the third threshold (Vth3) or the number of cycles in said plurality of switching cycles in the burst exceeds a determined maximum value ($n_{swmax}$).

The method may include turning on the high side clamp switch (Q2) every time a predetermined number of switching cycles ($N_x$) is counted starting from said one given cycle (p) of the switching cycles in the burst in a cycle occurring first after said predetermined number of switching cycles ($N_x$), depending on the input voltage value of the converter, in particular if the input voltage is equal or lower than a given value.

The method may include, if the control voltage (Vc) subsequently becomes greater than the second threshold (Vth2) performing a burst including a plurality of switching cycles ($n_{sw}$), in which the high side clamp switch (Q2) is turned on only in the first cycle (p) of the switching cycles in the burst including a plurality of switching cycles, and, if a number of cycles counted from said first cycle (p) in the burst ($n_{sw}$) exceeds a predetermined number of switching cycles ($N_x$), the high side clamp switch (Q2) is turned on every time a predetermined number of switching cycles ($N_x$) is counted starting from said first cycle (p) of the switching cycles in the burst, in a switching cycle occurring first after said predetermined number of switching cycles ($N_x$).

The method may include performing a finite state machine including a running state (S1), an idle state (S2), a bursting state with high side switch on (S3) and a bursting state with high side switch off (S4), wherein in the running state (S1), if the control voltage (Vc) is greater than first threshold (Vth1) the state machine stays (T11) in the running state (S1), in which the converter is switching, if the control voltage (Vc) is lower or equal than the first threshold (Vth1) a transition (T12) from state (S1) to idle state (S2) occurs, in idle state (S2) switching being stopped; in the idle state (S2), after a counter counting the number ($n_{sw}$) of switching cycles while in bursting state with high side switch on (S3) (S3) and bursting state with high side switch off (S4) may be reset; while the control voltage (Vc) is lower than the second threshold (Vth2) the idle state (S2) is maintained (T22), if the control voltage (Vc) is greater than the second threshold (Vth2) and a number of switching cycles ($n_{sw}$) is such that a remainder of an integer division by the predetermined number of switching cycles ($N_x$) corresponds to the value of said given position (p), in particular corresponds to one, a transition (T23) to the bursting state with high side switch on (S3) is performed; if the control voltage (Vc) is greater than the third threshold (Vth3) a reverse transition (T21) from idle state S2 to running state S1 takes place, in the bursting state with high side switch on (S3), during which the converter switches both the low side switch (Q1) and the high side switch (Q2), if the control voltage (Vc) is lower equal than first threshold (Vth1) then a transition (T32) back to the idle state (S2) is performed, if the control voltage (Vc) is greater than the third threshold (Vth3) or the number of cycles ($n_{sw}$) in a burst equals a determined maximum number of switching cycles ($n_{swmax}$) in a burst, then a transition (T31) to the running state (S1) is performed, if the current number ($n_{sw}$) of switching cycles in a burst is such that a remainder of an integer division by the predetermined number of switching cycles ($N_x$) is different from the value of said given position (p), in particular different from one, and it is lower than the maximum number of cycles ($n_{swmax}$) then a transition (T34) from bursting state with high side switch on (S3) to bursting state with high side transistor off (S4) is performed, in the bursting state with high side switch off (S4), during which the converter switches only the low side switch (Q1), the bursting state with high side switch off (S4) is maintained (T44) then if the current counted number ($n_{sw}$) of switching cycles in a burst is such that a remainder of an integer division by the predetermined number of switching cycles ($N_x$) is different from the value of said given position (p), in particular different from one, and it is lower than the maximum number of cycles ($n_{swmax}$), if the number of counted switching cycles ($n_{sw}$) is such that a remainder of an integer division by the predetermined number of switching cycles ($N_x$) corresponds to the value of said given position (p), in particular corresponds to one, and it is lower than the maximum number of cycles in a burst ($n_{swmax}$), transition (T43) to bursting state with high side transistor Q2 on (S3) is performed; if the control voltage (Vc) is lower than or equal to the first threshold (Vth1) a transition T42 to idle state (S2) is performed; if the control voltage (Vc) is greater than the third threshold (Vth3) or the number of counted cycles $n_{sw}$ equals a determined maximum number of switching cycles ($n_{swmax}$) a transition (T41) to running state S1 is performed.

An Active Clamp Flyback converter may be summarized as including a transformer (11) and a switching circuit, (Q1, Q2 driven by controller (13), with an active clamp circuit (24) determining a clamp voltage drop between an input terminal node (Vin) and a clamp node (CN), coupled between the terminals of a primary winding of said transformer (11), said switching circuit including a high side clamp switch (Q2) coupled between said clamp node (CN) and said other terminal of said primary winding, and a low side switch (Q1) coupled between other terminal of said primary winding of a transformer (11) and ground (GND), said high side clamp switch (Q2) and low side transistor (Q1) being driven to switch between on and off states, in particular according to a complementary or non-complementary control, said high side clamp transistor (Q2) and low side transistor Q1) being controlled by a controller (13; 80) on the basis of a control voltage (Vc) generated by a control loop on the basis of an error signal between an output voltage ($V_{out}$) of the converter and a reference voltage, said controller (13, 80) being configured to operate according to modes including a normal operation mode (S1) in which said controller (13; 80) continuously perform the switching of said switches (Q1, Q2) and a burst operation mode in which said controller (13; 80) drives said high side clamp switch (Q2) and low side switch (Q1) in bursts of switching cycles S3, S4) separated by idle time intervals (S2) during which the converter (20) does not switch, wherein said controller (80) is configured to operate in burst operation mode (S3, S4).

Said controller (80) may include a first comparator with hysteresis (CO1) configured to compare the control voltage (Vc) to the first (Vth1) and second (Vth2) threshold to determine a running mode logic signal (RUN), which enables operation of a PWM generator (801) configured to generate a PWM low side signal (PWM1) and a PWM high side signal (PWM2), which at least are not at high logic level at the same time, and from which signals (SQ1, SQ2) commanding the low side switch (Q1) and high side switch (Q2) may be obtained, a circuit (81) configured to generate an enable signal (Q2EN) of the command signal (SQ2) of the high side switch (Q2) as a function of the running mode signal (RUN), the control voltage (Vc) and of the PWM low side signal (PWM1) received as inputs, said circuit including a second comparator (CO2) configured to compare the control voltage (Vc) to the third (Vth3) threshold, the output signal of said second comparator enabling (Q2EN) the command signal (SQ2) of the high side switch (Q2) when the control voltage (Vc) is greater than the third (Vth3) threshold.

Said circuit (81) may include a first counter (811) and a second counter (812) receiving the first PWM signal (PWM1) as input, the first counter (811) being configured to change its output logic state to a value enabling (Q2EN) the command signal (SQ2) of the high side switch (Q2) when its count ($n_{sw}$) of PWM cycles of the first PWM signal (PWM1) reaches the maximum number of cycles ($n_{swmax}$), the second counter (812) being configured to keep its output at a logic state enabling (Q2EN) the command signal (SQ2) of the high side switch (Q2) during one given cycle (p) of a burst, in particular the first cycle, and changing its output logic state after said one given cycle till its count ($n_{sw}$) of PWM cycles of the first PWM signal (PWM1) reaches a predetermined number of switching cycles ($N_x$+p−1).

Said switches may be power MOSFET transistor switches.

In an embodiment, a method comprises: comparing a control signal of an active clamp flyback converter to a plurality of three or more thresholds; counting a number of consecutive switching cycles during which a clamp switch of the active flyback converter remains off; and selectively transitioning the active clamp flyback converter between a plurality of operational states by controlling a power switch and the clamp switch of the active clamp flyback converter. The plurality of operational states include: a run state of operation of one or more consecutive switching cycles of the active flyback converter, each switching cycle during the run state of operation comprising sequentially turning the power switch on, turning the power switch off, turning the clamp switch on and turning the clamp switch off; an idle state of operation of one or more consecutive switching cycles of the active flyback converter during which the power switch and the clamp switch are off; a first burst state of operation of one or more sets of consecutive switching cycles, each set of consecutive switching cycles of the first burst state including: a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off; and a second burst state of operation of one or more sets of consecutive switching cycles during which the power switch is turned on and off and the clamp switch is off. The selectively transitioning is based on the comparing of the control signal to the plurality of three or more thresholds and the count of the number of consecutive switching cycles during which the clamp switch remains off.

In an embodiment, the control signal is a control voltage and the plurality of three or more thresholds comprises a first threshold voltage, a second threshold voltage having a magnitude greater than a magnitude of the first threshold voltage, and a third threshold voltage having a magnitude greater than the magnitude of the second threshold voltage. In an embodiment, the method comprises: in the idle state of operation, transitioning to the run state in response to the control voltage being greater than the third threshold voltage; in the first burst state of operation, transitioning to the run state of operation in response to: the control voltage being greater than the third threshold voltage; or the count being equal to a maximum threshold number; and in the second burst state of operation, transitioning to the run state of operation in response to: the control voltage being greater than the third threshold voltage; or the count being equal to the maximum threshold number. In an embodiment, the method comprises: in the run state of operation, transitioning to the idle state of operation in response to the control voltage being less than or equal to the first threshold voltage; in the first burst state of operation, transitioning to the idle state of operation in response to the control voltage being less than or equal to the first threshold voltage; and in the second burst state of operation, transitioning to the idle state of operation in response to the control voltage being less than or equal to the first threshold voltage.

In an embodiment, the method comprises: in the idle state of operation, transitioning to the first burst state of operation in response to the control voltage being greater than the second threshold voltage; in the first burst state of operation, transitioning to the second burst state of operation in response to: the count modulo the determined number of cycles not being equal to a number representing the determined position; and the count being less than a maximum threshold number; and in the second burst state of operation, transitioning to the first burst state of operation in response to: the count modulo the determined number of cycles being equal to the number representing the determined position; and the count being less than the maximum threshold number. In an embodiment, the method comprises: in the first burst state of operation, transitioning to the idle state of operation in response to the control voltage being less than or equal to the first threshold voltage; in the first burst state of operation, transitioning to the running state of operation in response to: the control voltage being greater than the third threshold voltage; or the count being equal to the maximum threshold number; in the second burst state of operation, transitioning to the idle state of operation in response to the control voltage being less than or equal to the first threshold voltage; in the second burst state of operation, transitioning to the running state of operation in response to: the control voltage being greater than the third threshold voltage; or the count being equal to the maximum threshold number.

In an embodiment, the determined position is a first position in the set of consecutive switching cycles of the first burst state.

In an embodiment, the method comprises: in the run state of operation, transitioning to the idle state of operation in response to the control voltage being less than or equal to the first threshold voltage; in the first burst state of operation, transitioning to the idle state of operation in response to: the control voltage being less than or equal to the first threshold voltage; and the count being greater than a minimum threshold count; and in the second burst state of operation, transitioning to the idle state of operation in response to: the control voltage being less than or equal to the first threshold voltage; and the count being greater than a minimum threshold count. In an embodiment, the method comprises: in the idle state of operation, transitioning to the first burst state of operation in response to: the control voltage being greater than the second threshold voltage; and the count modulo the determined number of cycles being equal to a number representing the determined position; in the first burst state of operation, transitioning to the second burst state of operation in response to: the count modulo the determined number of cycles not being equal to the number representing the determined position; and the count being less than a maximum threshold number; and in the second burst state of operation, transitioning to the first burst state of operation in response to: the count modulo the determined number of cycles being equal to the number representing the determined position; and the count being less than the maximum threshold number. In an embodiment, the method comprises: in the first burst state of operation, transitioning to the idle state of operation in response to: the control voltage being less than or equal to the first threshold voltage; and the count being greater than a minimum threshold count; in the first burst state of operation, transitioning to the running state of operation in response to: the control voltage being greater than the third threshold voltage; or the count being equal to the maximum threshold number; in the second burst state of operation, transitioning to the idle state of operation in response to: the control voltage being less than or equal to the first threshold voltage; and the count being greater than the minimum threshold count; in the second burst state of operation, transitioning to the running state of operation in response to: the control voltage being greater than the third threshold voltage; or the count being equal to the maximum threshold number. In an embodiment, the method comprises: in the idle state of operation, transitioning to the second burst state of operation in response to: the control voltage being greater than the second threshold voltage; and the count modulo the determine number not being equal to the number representing the determined position. In an embodiment, in the run state of operation, the power switch and the clamping switch are operated according to a non-complementary control scheme.

In an embodiment, a system comprises: an active clamp flyback converter having a transformer, a power switch and a clamp switch; and control circuitry coupled to the active clamp flyback converter, wherein the control circuitry, in operation: compares a control voltage of the active clamp flyback converter to a first voltage threshold, a second voltage threshold having a magnitude greater than a magnitude of the first voltage threshold, and a third voltage threshold having a magnitude greater than a magnitude of the second voltage threshold; counts a number of consecutive switching cycles during which the clamp switch remains off; and selectively transitions the active clamp flyback converter between a plurality of operational states. The plurality of operational states including: a run state of operation of one or more consecutive switching cycles of the active flyback converter, each switching cycle during the run state of operation comprising sequentially turning the power switch on, turning the power switch off, turning the clamp switch on and turning the clamp switch off; an idle state of operation of one or more consecutive switching cycles of the active flyback converter during which the power switch and the clamp switch are off; a first burst state of operation of one or more sets of consecutive switching cycles, each set of consecutive switching cycles of the first burst state including: a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off; and a second burst state of operation of one or more sets of consecutive switching cycles during which the power switch is turned on and off and the clamp switch is off, wherein the selectively transitioning is based on the comparing of the control signal to the voltage thresholds and the count of the number of consecutive switching cycles during which the clamp switch remains off.

In an embodiment, the control circuitry comprises: a first comparator with hysteresis configured to compare the control voltage to the first and second thresholds to determine a running mode logic signal, which enables operation of a PWM generator configured to generate a PWM power switch signal and a PWM clamp switch signal, and from which signals commanding the power switch and clamp switch are obtained, a burst control circuit configured to generate an enable signal of the command signal of the clamp switch as a function of the running mode signal, the control voltage and of the PWM clamp switch signal received as inputs, said burst control circuit comprising a second comparator configured to compare the control voltage to the third threshold, the output signal of said second comparator enabling the command signal of the clamp switch when the control voltage is greater than the third threshold. In an embodiment, said burst control circuit comprises a first counter and a second counter receiving the PWM power switch signal as input, the first counter being configured to change its output logic state to a value enabling the command signal of the clamp switch when its count of PWM cycles of the first PWM signal reaches a maximum threshold number of cycles, the second counter being configured to enable the command signal of the clamp switch during the determined cycle of a burst. In an embodiment, the power switch and the clamp switch are power MOSFET transistor switches.

In an embodiment, a device comprises: one or more comparators, which, in operation, compare a control voltage signal of an active clamp flyback converter to a first voltage threshold, a second voltage threshold and a third voltage threshold, wherein a magnitude of the second voltage threshold is greater than a magnitude of the first voltage threshold and a magnitude of the third voltage threshold is greater than a magnitude of the second voltage threshold; and logic circuitry coupled to the one or more comparators, wherein the logic circuitry, in operation: selectively transitions between a plurality of operational states, the plurality of operational states including: a run state of operation of one or more consecutive switching cycles, each switching cycle during the run state of operation comprising sequentially generating signals to turn a power switch on, turn the power switch off, turn a clamp switch on and turn the clamp switch off; an idle state of operation of one or more consecutive switching cycles of the active flyback converter during which signals are generated to maintain off states of the power switch and the clamp switch; a first burst state of operation of one or more sets of consecutive switching cycles, each set of consecutive switching cycles of the first burst state including: a determined number of switching cycles during which signals are generated to turn the power switch on and off and to maintain an off state of the clamp switch; and a switching cycle in a determined position in the set of switching cycles during which signals are sequentially generated to turn the power switch on, turn the power switch off, turn the clamp switch on and turn the clamp switch off; and a second burst state of operation of one or more sets of consecutive switching cycles during which signals are generated to turn the power switch on and off and to maintain an off state of the clamp switch; and counts a number of consecutive switching cycles during which an off state of the clamp switch is maintained. The selectively transitioning is based on the comparing of the control voltage signal to the voltage thresholds and the count of the number of consecutive switching cycles during which an off state of the clamp switch is maintained.

In an embodiment, in the idle state of operation, the logic circuitry transitions to the run state in response to the control voltage being greater than the third threshold voltage; in the first burst state of operation, the logic circuitry transitions to the run state of operation in response to: the control voltage being greater than the third threshold voltage; or the count being equal to a maximum threshold number; and in the second burst state of operation, the logic circuitry transitions to the run state of operation in response to: the control voltage being greater than the third threshold voltage; or the count being equal to the maximum threshold number. In an embodiment, in the run state of operation, the logic circuitry transitions to the idle state of operation in response to the control voltage being less than or equal to the first threshold voltage; in the first burst state of operation, the logic circuitry transitions to the idle state of operation in response to the control voltage being less than or equal to the first threshold voltage; and in the second burst state of operation, the logic circuitry transitions to the idle state of operation in response to the control voltage being less than or equal to the first threshold voltage. In an embodiment, in the idle state of operation, the logic circuitry transitions to the first burst state of operation in response to the control voltage being greater than the second threshold voltage; in the first burst state of operation, the logic circuitry transitions to the second burst state of operation in response to: the count modulo the determined number of cycles not being equal to a number representing the determined position; and the count being less than a maximum threshold number; and in the second burst state of operation, the logic circuitry transitions to the first burst state of operation in response to: the count modulo the determined number of cycles being equal to the number representing the determined position; and the count being less than the maximum threshold number. In an embodiment, the logic circuitry comprises a finite state machine, which, in operation, controls the transitions between the plurality of operational states.

In an embodiment, a non-transitory computer-readable medium's contents cause control circuitry to control operation of an active flyback converter device, the controlling comprising: selectively transitioning the active clamp flyback converter between a plurality of operational states by controlling a power switch and a clamp switch of the active clamp flyback converter, the plurality of operational states including: a run state of operation of one or more consecutive switching cycles of the active flyback converter, each switching cycle during the run state of operation comprising sequentially turning the power switch on, turning the power switch off, turning the clamp switch on and turning the clamp switch off; an idle state of operation of one or more consecutive switching cycles of the active flyback converter during which the power switch and the clamp switch are off; a first burst state of operation of one or more sets of consecutive switching cycles, each set of consecutive switching cycles of the first burst state including: a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off; and a second burst state of operation of one or more sets of consecutive switching cycles during which the power switch is turned on and off and the clamp switch is off; comparing a control signal of an active clamp flyback converter to a plurality of three or more thresholds; and counting a number of consecutive switching cycles during which the clamp switch remains off, wherein the selectively transitioning is based on the comparing of the control signal to the plurality of three or more thresholds and the count of the number of consecutive switching cycles during which the clamp switch remains off. In an embodiment, the control signal is a control voltage and the plurality of three or more thresholds comprise a first threshold voltage, a second threshold voltage having a magnitude greater than a magnitude of the first threshold voltage, and a third threshold voltage having a magnitude greater than the magnitude of the second threshold voltage. In an embodiment, the contents comprise instructions executed by the control circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

comparing a control signal of an active clamp flyback converter to a plurality of three or more thresholds;

counting a number of consecutive switching cycles during which a clamp switch of the active flyback converter remains off; and selectively transitioning the active clamp flyback converter between a plurality of operational states by controlling a power switch and the clamp switch of the active clamp flyback converter based on the comparing of the control signal to the plurality of three or more thresholds and the count of the number of consecutive switching cycles during which the clamp switch remains off, the plurality of operational states including:

a run state of operation of one or more consecutive switching cycles of the active flyback converter;

an idle state of operation of one or more consecutive switching cycles of the active flyback converter;

a first burst state of operation of one or more sets of consecutive switching cycles of the active flyback converter; and a second burst state of operation of one or more sets of consecutive switching cycles of the active flyback converter during which the power switch is turned on and off and the clamp switch is off.

2. The method of claim 1 wherein the control signal is a control voltage and the plurality of three or more thresholds comprises a first threshold voltage, a second threshold voltage having a magnitude greater than a magnitude of the first threshold voltage, and a third threshold voltage having a magnitude greater than the magnitude of the second threshold voltage.

3. The method of claim 2, comprising:

in the idle state of operation, transitioning to the run state in response to the control voltage being greater than the third threshold voltage;

in the first burst state of operation, transitioning to the run state of operation in response to:

the control voltage being greater than the third threshold voltage; or the count being equal to a maximum threshold number; and in the second burst state of operation, transitioning to the run state of operation in response to:

the control voltage being greater than the third threshold voltage; or the count being equal to the maximum threshold number.

4. The method of claim 2, comprising:

in the run state of operation, transitioning to the idle state of operation in response to the control voltage being less than or equal to the first threshold voltage;

in the first burst state of operation, transitioning to the idle state of operation in response to the control voltage being less than or equal to the first threshold voltage; and in the second burst state of operation, transitioning to the idle state of operation in response to the control voltage being less than or equal to the first threshold voltage.

5. The method of claim 2, comprising:

in the idle state of operation, transitioning to the first burst state of operation in response to the control voltage being greater than the second threshold voltage;

in the first burst state of operation, transitioning to the second burst state of operation in response to:

the count modulo the determined number of cycles not being equal to a number representing the determined position; and the count being less than a maximum threshold number; and in the second burst state of operation, transitioning to the first burst state of operation in response to:

the count modulo the determined number of cycles being equal to the number representing the determined position; and the count being less than the maximum threshold number.

6. The method of claim 5, comprising:

in the first burst state of operation, transitioning to the idle state of operation in response to the control voltage being less than or equal to the first threshold voltage;

in the first burst state of operation, transitioning to the running state of operation in response to:

the control voltage being greater than the third threshold voltage; or the count being equal to the maximum threshold number;

in the second burst state of operation, transitioning to the idle state of operation in response to the control voltage being less than or equal to the first threshold voltage; and in the second burst state of operation, transitioning to the running state of operation in response to:

the control voltage being greater than the third threshold voltage; or the count being equal to the maximum threshold number.

7. The method of claim 2, comprising:

in the run state of operation, transitioning to the idle state of operation in response to the control voltage being less than or equal to the first threshold voltage;

in the first burst state of operation, transitioning to the idle state of operation in response to:

the control voltage being less than or equal to the first threshold voltage; and the count being greater than a minimum threshold count; and in the second burst state of operation, transitioning to the idle state of operation in response to:

the control voltage being less than or equal to the first threshold voltage; and the count being greater than a minimum threshold count.

8. The method of claim 2, wherein each set of consecutive switching cycles of the first burst state includes:

a determined number of switching cycles during which the power switch is turned on and off and the clamp switch is off; and a switching cycle in a determined position in the set of switching cycles comprising sequentially turning the power switch on, turning the power switch off, turning the clamp switch on and turning the clamp switch off.

9. The method of claim 8, comprising:

in the idle state of operation, transitioning to the first burst state of operation in response to:

the control voltage being greater than the second threshold voltage; and the count modulo the determined number of cycles being equal to a number representing the determined position;

in the first burst state of operation, transitioning to the second burst state of operation in response to:

the count modulo the determined number of cycles not being equal to the number representing the determined position; and the count being less than a maximum threshold number; and in the second burst state of operation, transitioning to the first burst state of operation in response to:

the count modulo the determined number of cycles being equal to the number representing the determined position; and the count being less than the maximum threshold number.

10. The method of claim 9, comprising:

in the first burst state of operation, transitioning to the idle state of operation in response to:

the control voltage being less than or equal to the first threshold voltage; and the count being greater than a minimum threshold count;

in the first burst state of operation, transitioning to the running state of operation in response to:

the control voltage being greater than the third threshold voltage; or the count being equal to the maximum threshold number;

in the second burst state of operation, transitioning to the idle state of operation in response to:

the control voltage being less than or equal to the first threshold voltage; and the count being greater than the minimum threshold count; and in the second burst state of operation, transitioning to the running state of operation in response to:

the control voltage being greater than the third threshold voltage; or the count being equal to the maximum threshold number.

11. The method of claim 10, comprising:

in the idle state of operation, transitioning to the second burst state of operation in response to:

the control voltage being greater than the second threshold voltage; and the count modulo the determine number not being equal to the number representing the determined position.

12. The method of claim 1, wherein, in the run state of operation, the power switch and the clamping switch are operated according to a non-complementary control scheme.

13. A system, comprising:

an active clamp flyback converter having a transformer, a power switch and a clamp switch; and control circuitry coupled to the active clamp flyback converter, wherein the control circuitry, in operation:

compares a control voltage of the active clamp flyback converter to a first voltage threshold, a second voltage threshold having a magnitude greater than a magnitude of the first voltage threshold, and a third voltage threshold having a magnitude greater than a magnitude of the second voltage threshold;

counts a number of consecutive switching cycles during which the clamp switch remains off; and selectively transitions the active clamp flyback converter between a plurality of operational states based on the comparing of the control signal to the voltage thresholds and the count of the number of consecutive switching cycles during which the clamp switch remains off, the plurality of operational states including:

a run state of operation of one or more consecutive switching cycles of the active flyback converter;

an idle state of operation of one or more consecutive switching cycles of the active flyback converter;

a first burst state of operation of one or more sets of consecutive switching cycles of the active flyback converter; and a second burst state of operation of one or more sets of consecutive switching cycles during which the power switch is turned on and off and the clamp switch is off.

14. The system of claim 13, wherein the control circuitry comprises:

a first comparator with hysteresis, which, in operation, compares the control voltage to the first and second thresholds;

a pulse width modulated (PWM) signal generator coupled to the first comparator, wherein the PWM signal generator, in operation, generates a PWM power switch signal and a PWM clamp switch signal;

a second comparator, which, in operation, compares the control voltage to the third threshold; and one or more counters, which, in operation, count cycles of the PWM power switch signal.

15. The system of claim 13, wherein the control circuitry comprises comprises a finite state machine, which, in operation, controls transitions between the plurality of operational states.

16. The system of claim 13, wherein the power switch and the clamp switch are power MOSFET transistor switches.

17. A device, comprising:

one or more comparators, which, in operation, compare a control voltage signal of an active clamp flyback converter to a first voltage threshold, a second voltage threshold and a third voltage threshold, wherein a magnitude of the second voltage threshold is greater than a magnitude of the first voltage threshold and a magnitude of the third voltage threshold is greater than a magnitude of the second voltage threshold; and logic circuitry coupled to the one or more comparators, wherein the logic circuitry, in operation:

counts a number of consecutive switching cycles during which an off state of a clamp switch of the active clamp flyback converter is maintained; and selectively transitions the active clamp flyback converter between a plurality of operational states based on the comparing of the control voltage signal to the voltage thresholds and the count of the number of consecutive switching cycles during which the off state of the clamp switch is maintained, the plurality of operational states including:

a run state of operation of one or more consecutive switching cycles;

an idle state of operation of one or more consecutive switching cycles;

a first burst state of operation of one or more sets of consecutive switching cycles; and a second burst state of operation of one or more sets of consecutive switching cycles during which signals are generated to turn the power switch on and off and to maintain an off state of the clamp switch.

18. The device of claim 17, wherein:

in the idle state of operation, the logic circuitry transitions to the run state in response to the control voltage being greater than the third threshold voltage;

in the first burst state of operation, the logic circuitry transitions to the run state of operation in response to:

the control voltage being greater than the third threshold voltage; or the count being equal to a maximum threshold number; and in the second burst state of operation, the logic circuitry transitions to the run state of operation in response to:

the control voltage being greater than the third threshold voltage; or the count being equal to the maximum threshold number.

19. The device of claim 17, wherein:

in the run state of operation, the logic circuitry transitions to the idle state of operation in response to the control voltage being less than or equal to the first threshold voltage;

in the first burst state of operation, the logic circuitry transitions to the idle state of operation in response to the control voltage being less than or equal to the first threshold voltage; and in the second burst state of operation, the logic circuitry transitions to the idle state of operation in response to the control voltage being less than or equal to the first threshold voltage.

20. The device of claim 17, wherein:

in the idle state of operation, the logic circuitry transitions to the first burst state of operation in response to the control voltage being greater than the second threshold voltage;

in the first burst state of operation, the logic circuitry transitions to the second burst state of operation in response to:

the count modulo the determined number of cycles not being equal to a number representing the determined position; and the count being less than a maximum threshold number; and in the second burst state of operation, the logic circuitry transitions to the first burst state of operation in response to:

the count modulo the determined number of cycles being equal to the number representing the determined position; and the count being less than the maximum threshold number.

21. A non-transitory computer-readable medium having contents which cause control circuitry to control operation of an active flyback converter device, the controlling comprising:

selectively transitioning the active clamp flyback converter between a plurality of operational states by controlling a power switch and a clamp switch of the active clamp flyback converter, the plurality of operational states including:

a run state of operation of one or more consecutive switching cycles;

an idle state of operation of one or more consecutive switching cycles;

a first burst state of operation of one or more sets of consecutive switching cycles; and a second burst state of operation of one or more sets of consecutive switching cycles during which the power switch is turned on and off and the clamp switch is off;

comparing a control signal of an active clamp flyback converter to a plurality of three or more thresholds; and counting a number of consecutive switching cycles during which the clamp switch remains off, wherein the selectively transitioning is based on the comparing of the control signal to the plurality of three or more thresholds and the count of the number of consecutive switching cycles during which the clamp switch remains off.

22. The non-transitory computer-readable medium of claim 21, wherein the contents comprise instructions executed by the control circuitry.

* * * * *